(12) United States Patent
Hong

(10) Patent No.: US 12,299,095 B2
(45) Date of Patent: May 13, 2025

(54) METHOD AND APPARATUS FOR AUTHENTICATING HANDWRITTEN SIGNATURE BASED ON MULTIPLE AUTHENTICATION ALGORITHMS

(71) Applicant: SECUVE Co., Ltd., Seoul (KR)

(72) Inventor: Ki-Yoong Hong, Seoul (KR)

(73) Assignee: SECUVE Co., Ltd., Seoul (KR)

( * ) Notice: Subject to any disclaimer, the term of this patent is extended or adjusted under 35 U.S.C. 154(b) by 386 days.

(21) Appl. No.: 16/758,705

(22) PCT Filed: Apr. 7, 2020

(86) PCT No.: PCT/KR2020/004647
§ 371 (c)(1),
(2) Date: Sep. 13, 2022

(87) PCT Pub. No.: WO2021/149869
PCT Pub. Date: Jul. 29, 2021

(65) Prior Publication Data
US 2023/0004630 A1 Jan. 5, 2023

(30) Foreign Application Priority Data
Jan. 20, 2020 (KR) .................. 10-2020-0007597

(51) Int. Cl.
| | | |
|---|---|---|
| G06F 21/32 | (2013.01) | |
| G06F 21/31 | (2013.01) | |
| G06F 21/45 | (2013.01) | |
| G06V 10/774 | (2022.01) | |

(Continued)

(52) U.S. Cl.
CPC ............. *G06F 21/32* (2013.01); *G06F 21/316* (2013.01); *G06F 21/45* (2013.01); *G06V 10/774* (2022.01); *G06V 10/776* (2022.01); *G06V 40/382* (2022.01); *G06V 40/394* (2022.01)

(58) Field of Classification Search
CPC . G06T 2207/00; G06T 2207/30; G06F 21/32; G06F 21/316; G06F 21/45; G06V 40/394; G06V 40/382; G06V 10/774; G06V 10/76
See application file for complete search history.

(56) References Cited

U.S. PATENT DOCUMENTS

| | | | | |
|---|---|---|---|---|
| 10,095,851 | B2* | 10/2018 | Seo ...................... | G06F 3/04883 |
| 2018/0204049 | A1* | 7/2018 | Hong ................. | G06V 30/1423 |
| 2018/0247108 | A1* | 8/2018 | Hong ................... | G06F 3/0488 |

(Continued)

*Primary Examiner* — Daniel B Potratz
*Assistant Examiner* — Faghia Telat Rana
(74) *Attorney, Agent, or Firm* — Studebaker Brackett PLLC

(57) ABSTRACT

According to the present disclosure, a handwritten signature to be authenticated is received, a plurality of pieces of signature behavioral characteristic information are extracted, all of the plurality of the pieces of the extracted signature behavioral characteristic information are applied to each of first and second signature authentication algorithms using different techniques to analyze a degree of matching between the received handwritten signature and a registered handwritten signature, results of analysis performed by the first and second signature authentication algorithms are combined to adjust a false rejection rate and a false acceptance rate, and whether handwritten signature authentication succeeds is finally determined.

15 Claims, 7 Drawing Sheets

(51) Int. Cl.
*G06V 10/776* (2022.01)
*G06V 40/30* (2022.01)

(56) References Cited

U.S. PATENT DOCUMENTS

2018/0357469 A1* 12/2018 Hong ................... G06F 3/0488
2019/0318148 A1* 10/2019 Hong ................... G06F 21/32

* cited by examiner

METHOD AND APPARATUS FOR AUTHENTICATING HANDWRITTEN SIGNATURE BASED ON MULTIPLE AUTHENTICATION ALGORITHMS

CROSS-REFERENCE TO RELATED APPLICATIONS

This application is a National Stage of International Application No. PCT/KR2020/004647, filed Apr. 7, 2020, which claims benefit of priority to Korean Patent Application No. 10-2020-0007597 filed Jan. 20, 2020, the entire content of which is incorporated herein by reference.

TECHNICAL FIELD

The present disclosure relates to a method and an apparatus for authenticating a handwritten signature for user authentication using the input handwritten signature. More particularly, the present disclosure relates to a method and an apparatus for authenticating a handwritten signature on the basis of multiple authentication algorithms, the method and the apparatus performing determination by combining results of analysis performed by the authentication algorithms of different types, thereby improving the accuracy of handwritten signature authentication.

BACKGROUND ART

A signature is someone's name, assumed name, a proof that someone has made a record on a document, or a mark for identity, and is handwritten by a person. The signature is used for user identification in payment for financial transactions with credit cards or transactions of movable/immovable property, sanctions for various documents processed in companies, and issuance of certificates at government offices.

In the meantime, as the use of online services deepens due to the development and wide use of information and communication technologies, various user authentication technologies have been developed and used to prevent unauthorized access to various online services and personal information.

In general, user authentication technologies may be classified into knowledge-based, ownership-based, and individual characteristic-based authentication techniques.

The knowledge-based authentication technique is a technique for performing authentication based on information, such as a password or a personal identification number (PIN), which a user remembers.

The ownership-based authentication technique is a technique for authenticating a user by using various media that the user owns, for example, a smart card, a token, and a one-time password (OTP).

The individual characteristic-based authentication technique is a technique for authenticating a user on the basis of individual biometric characteristics, such as a fingerprint, an iris, a palm print, a voice print, and a face image.

Among these techniques, the knowledge-based authentication technique is easy to guess using personal information. In addition, it is easy to crack the technique with software such as a cracking tool, and when a randomly set password is used, it is difficult to remember the password. Regarding the ownership-based authentication technique, the security of the media needs to be secured and there is also the inconvenience of owning the media.

However, the individual characteristic-based authentication technique uses a user's individual characteristics, so the user is provided with great convenience and illegal use is prevented. Recently, accuracy is improved with the development of technology, so there is a rapidly increasing interest in the technique.

As characteristic information of a user, the individual characteristic-based authentication technique uses biometric information, such as a fingerprint, an iris, a voice print, and a face image, and behavior information, such as a voice pattern, a gait, a speaking speed, and an input posture or speed.

Similarly, even for handwritten signatures that users write by their hands, personal characteristics of the users are included, so authentication based on individual characteristics is possible. An authentication technology using a handwritten signature may be applied in a face-to-face situation as well as a non-face-to-face situation, or may be applied to online and offline processing.

Examples of the handwritten signature authentication technique include the following methods: an image comparison method in which consistency in the shape in the handwritten signature image is checked, and a behavior characteristic comparison method in which when a signatory writes the handwritten signature, handwritten signature behavioral characteristic data of signatory's signature writing behavior features is compared.

In general, in a handwritten signature authentication system to which the image comparison method is applied, if even a third party imitates only the image shape of the handwritten signature, it may be determined that the handwritten signature is matched. Therefore, unfortunately, it is easy for a third party to use a signature by stealth. Because of this problem with image comparison, the behavior characteristic comparison method rather than the image comparison method is applied to the handwritten signature authentication system.

In the handwritten signature authentication technology based on behavioral characteristics, authentication is performed by extracting behavioral characteristics that occur in a signatory's signature habits when a handwritten signature is written. Therefore, illegal use is more effectively prevented than in the image comparison method. However, there is a probability that authentication fails despite an authorized signature or that an imitated signature is recognized as an authorized signature of a user. Therefore, it is necessary to increase accuracy of authentication enough to accurately distinguish a handwritten signature imitated through forgery, theft, or copying from a user's authorized handwritten signature.

In particular, in the handwritten signature authentication technology, when a false rejection rate (FRR) that is a ratio of authentication failure despite of an authorized signature is reduced, a false acceptance rate (FAR) that is a ratio of authentication success of an imitated signature is increased. Conversely, when the false acceptance rate is reduced, the false rejection rate is increased. Therefore, it is difficult to satisfy both the false rejection rate and the false acceptance rate.

DISCLOSURE

Technical Problem

Accordingly, the present disclosure is directed to providing a method and an apparatus for authenticating a handwritten signature on the basis of multiple authentication algorithms, wherein with respect to the input handwritten signature, whether authentication of the handwritten signature succeeds is finally determined by combining results of analysis performed by the authentication algorithms of two different types, so that a false rejection rate and a false acceptance rate are simultaneously satisfied and the accuracy of a result of authentication is thus improved.

Technical Solution

According to the present disclosure, there is provided a method for authenticating a handwritten signature on the basis of multiple authentication algorithms: receiving, at a characteristic extraction step, the handwritten signature to be authenticated, and extracting a plurality of pieces of signature behavioral characteristic information; applying, at a first analysis step, all the extracted plurality of the pieces of the signature behavioral characteristic information to each of a first signature authentication algorithm and a second signature authentication algorithm that perform handwritten signature authentication with different techniques, and generating a first analysis result and a second analysis result by analyzing a degree of matching between the received handwritten signature and a registered handwritten signature; determining, at an adjustment direction determination step, whether to perform either adjustment of a false acceptance rate or adjustment of a false rejection rate, by comparing each of the first analysis result and the second analysis result to each preset first analysis threshold value; extracting, at a second analysis step, the signature behavioral characteristic information sensitive to false-acceptance verification among the plurality of the pieces of the signature behavioral characteristic information when it is determined to perform adjustment of the false acceptance rate, and generating a third analysis result by analyzing the degree of matching between the received handwritten signature and the registered handwritten signature on the basis of the extracted signature behavioral characteristic information sensitive to false-acceptance verification; extracting, at a third analysis step, the signature behavioral characteristic information sensitive to false-rejection verification among the plurality of the pieces of the signature behavioral characteristic information when it is determined to perform adjustment of the false rejection rate, and generating a fourth analysis result by analyzing the degree of matching between the received handwritten signature and the registered handwritten signature on the basis of the extracted signature behavioral characteristic information sensitive to false-rejection verification; and determining, at a handwritten signature authentication step, whether authentication of the received handwritten signature succeeds, by comparing one or more of the analysis results of the first to the third analysis step to the first analysis threshold values and preset second analysis threshold values.

The first analysis threshold values may include: a first threshold value ($\rho$) that is a reference value for determining whether authentication succeeds in the first signature authentication algorithm; a second threshold value ($T1_{DL}$) that is a reference value for the first signature authentication algorithm and is set higher than the first threshold value ($\rho$); and a third threshold value ($T1_S$) that is a reference value for determining whether authentication succeeds in the second signature authentication algorithm, and the adjustment direction determination step may include: determining to perform adjustment of the false acceptance rate at a false acceptance rate adjustment determination step when the first analysis result is equal to or greater than the first threshold value ($\rho$), and when the second analysis result is equal to or greater than the third threshold value ($T1_S$), or the second analysis result is lower than the third threshold value ($T1_S$) and the first analysis result is equal to or greater than the second threshold value ($T1_{DL}$); and determining to perform adjustment of the false rejection rate at a false rejection rate adjustment determination step when the second analysis result is lower than the third threshold value ($T1_S$) and the first analysis result is equal to or greater than the first threshold value ($\rho$) but lower than the second threshold value ($T1_{DL}$).

The third analysis result and the fourth analysis result may be obtained by an analysis based on the second signature authentication algorithm, and at the determining of whether authentication succeeds, whether authentication succeeds may be determined by comparing the first analysis result and the second analysis result of the first analysis step to the first analysis threshold values, and by comparing the first analysis result, the third analysis result, and the fourth analysis result to a first threshold value ($\rho$) among the first analysis threshold values and the second analysis threshold values.

At the determining of whether authentication succeeds, it may be determined that authentication fails when the first analysis result analyzed at the first analysis step is lower than a fourth threshold value ($T2_{DL}$) that is one of the second analysis threshold values and the third analysis result analyzed at the second analysis step is lower than a fifth threshold value ($T2_S$) that is one of the second analysis threshold values, or it may be determined that authentication succeeds when the first analysis result is equal to or greater than the fourth threshold value ($T2_{DL}$) or the third analysis result is equal to or greater than the fifth threshold value ($T2_S$).

At the determining of whether authentication succeeds, it may be determined that authentication succeeds when the first analysis result analyzed at the first analysis step is lower than a sixth threshold value ($T3_{DL}$) that is one of the second analysis threshold values and the fourth analysis result analyzed at the third analysis step is equal to or greater than a seventh threshold value ($T3_S$) that is one of the second analysis threshold values.

Each of the first signature authentication algorithm and the second signature authentication algorithm may be either a deep learning-based algorithm or a matching degree analysis algorithm for scoring and determining the degree of matching.

The method may further include: collecting training handwritten signature data and setting the first threshold value ($\rho$), the second threshold value ($T1_{DL}$), and the third threshold value ($T1_S$) that are the first analysis threshold values resulting from training before the handwritten signature to be authenticated is received, at a first analysis threshold value setting step, wherein the first analysis threshold value setting step may further include: collecting the training handwritten signature data and extracting signature behavioral characteristic information before the handwritten signature to be authenticated is received; performing a primary training by applying all pieces of the signature behavioral characteristic information of the training handwritten signature data and a known authentication result of the training handwritten signature data to each of the first and second signature authentication algorithms; and extracting and setting the first threshold value ($\rho$), the second threshold value ($T1_{DL}$), and the third threshold value ($T1_S$) by analyzing a result of the primary training.

The method may further include: collecting training handwritten signature data and setting the second analysis threshold values that are analyzed through training by applying, to the second signature authentication algorithm, signature behavioral characteristic information sensitive according to a determined adjustment direction among pieces of the signature behavioral characteristic information extracted from the collected training handwritten signature data, before the handwritten signature to be authenticated is received, at a second analysis threshold value setting step, wherein the second analysis threshold value setting step may include: selecting the signature behavioral characteristic information sensitive to false-acceptance verification among the pieces of the signature behavioral characteristic information when the determined adjustment direction is adjustment of the false acceptance rate, at a selection step of signature behavioral characteristic information sensitive-to false-acceptance verification; performing a secondary training by applying, to the second signature authentication algorithm, the selected signature behavioral characteristic information sensitive to false-acceptance verification and a known authentication result of the signature behavioral characteristic information sensitive to false-acceptance verification, at a secondary training step; and extracting and setting the fourth threshold value ($T2_{DL}$) and the fifth threshold value ($T2_S$) that are the second analysis threshold values, considering a result of the secondary training, at a threshold value setting step.

The method may further include: collecting training handwritten signature data and setting the second analysis threshold values that are analyzed through training by applying, to the second signature authentication algorithm, signature behavioral characteristic information sensitive according to a determined adjustment direction among pieces of the signature behavioral characteristic information extracted from the collected training handwritten signature data, before the handwritten signature to be authenticated is received, at a second analysis threshold value setting step, wherein the second analysis threshold value setting step may include: selecting the signature behavioral characteristic information sensitive to false-rejection verification among the pieces of the signature behavioral characteristic information when the determined adjustment direction is adjustment of the false rejection rate, at a selection step of signature behavioral characteristic information sensitive-to false-rejection verification; performing a tertiary training by applying, to the second signature authentication algorithm, the selected signature behavioral characteristic information sensitive to false-rejection verification and a known authentication result of the signature behavioral characteristic information sensitive to false-rejection verification, at a tertiary training step; and extracting and setting the sixth threshold value ($T3_{DL}$) and the seventh threshold value ($T3_S$) that are the second analysis threshold values, considering a result of the tertiary training, at a threshold value setting step.

According to the present disclosure, there is provided an apparatus for authenticating a handwritten signature on the basis of multiple authentication algorithms, the apparatus including: a handwritten signature input part configured to extract signature behavioral characteristic information from handwritten signature data of the handwritten signature that a user is writing by hand, and output the signature behavioral characteristic information; a storage part configured to store therein a first signature authentication algorithm and a second signature authentication algorithm using different handwritten signature authentication techniques, and store therein first analysis threshold values and second analysis threshold values for determining authentication for the first signature authentication algorithm and determining authentication for the second signature authentication algorithm; and a controller configured to: apply the signature behavioral characteristic information for analysis to each of the first signature authentication algorithm and the second signature authentication algorithm when the signature behavioral characteristic information is obtained; obtain a first analysis result analyzed by the first signature authentication algorithm and a second analysis result analyzed by the second signature authentication algorithm; determine an adjustment direction to determine whether to perform either adjustment of a false acceptance rate or adjustment of a false rejection rate, by comparing the obtained first analysis result and the obtained second analysis result to the first analysis threshold values; obtain a third analysis result and a fourth analysis result by extracting only the signature behavioral characteristic information sensitive according to the determined adjustment direction among all pieces of the signature behavioral characteristic information, and by applying the extracted signature behavioral characteristic information sensitive according to the determined adjustment direction to the second signature authentication algorithm; and determine whether authentication of the handwritten signature succeeds, by comparing the first analysis result, the third analysis result, and the fourth analysis result to the second analysis threshold values preset.

The controller may include a handwritten signature authentication module, wherein the handwritten signature authentication module may include: a signature characteristic information acquisition part configured to obtain the signature behavioral characteristic information of the entire handwritten signature to be authenticated, through the handwritten signature input part, and output the signature behavioral characteristic information; a first signature authentication part to which the first signature authentication algorithm is applied, and configured to output the first analysis result by applying the all pieces of the signature behavioral characteristic information input from the signature characteristic information acquisition part to the first signature authentication algorithm and by performing analysis; a second signature authentication part to which the second signature authentication algorithm is applied, and configured to output the second analysis result by applying the all pieces of the signature behavioral characteristic information input from the signature characteristic information acquisition part to the second signature authentication algorithm and by performing analysis, and output the third analysis result and the fourth analysis result by receiving the signature behavioral characteristic information sensitive according to the adjustment direction, by applying the received signature behavioral characteristic information sensitive according to the adjustment direction to the second signature authentication algorithm, and by performing analysis; an adjustment part configured to: obtain the first analysis result from the first signature authentication part; obtain the second analysis result from the second signature authentication part; compare the obtained first analysis result and the obtained second analysis result to the first analysis threshold values to determine the adjustment direction to determine whether to perform either adjustment of the false acceptance rate or adjustment of the false rejection rate; and obtain and output the third analysis result and the fourth analysis result by extracting only the signature behavioral characteristic information sensitive according to the determined adjustment direction among the all pieces of the signature behavioral characteristic information, and by applying the extracted signature behavioral characteristic information sensitive according to the determined adjustment direction to the second signature authentication algorithm; and a final authentication processor configured to determine whether authentication of the handwritten signature succeeds, by comparing the first analysis result, the third analysis result, and the fourth analysis result to the first threshold value (ρ) among the first analysis threshold values and the second analysis threshold values preset.

The adjustment part may include: an adjustment direction determination part configured to obtain the first analysis result from the first signature authentication part, obtain the second analysis result from the second signature authentication part, and compare the obtained first analysis result and the obtained second analysis result to the first analysis threshold values to determine the adjustment direction to determine whether to perform either adjustment of the false acceptance rate or adjustment of the false rejection rate; an adjustment characteristic information extraction part configured to extract and output the signature behavioral characteristic information sensitive to false-acceptance verification among the all pieces of the signature behavioral characteristic information when the adjustment direction determined by the adjustment direction determination part is adjustment of the false acceptance rate, or configured to extract and output the signature behavioral characteristic information sensitive to false-rejection verification among the all pieces of the signature behavioral characteristic information when the adjustment direction is adjustment of the false rejection rate; a false acceptance rate adjustment part configured to provide the second signature authentication part with the signature behavioral characteristic information sensitive to false-acceptance verification output from the adjustment characteristic information extraction part when the adjustment direction determined by the adjustment direction determination part is adjustment of the false acceptance rate, and receive, in response thereto, the third analysis result from the second signature authentication part, and provide the first analysis result, the third analysis result, the first threshold value (ρ) among the first analysis threshold values, and the second analysis threshold values to the final authentication processor; and a false rejection rate adjustment part configured to provide the second signature authentication part with the signature behavioral characteristic information sensitive to false-rejection verification output from the adjustment characteristic information extraction part when the adjustment direction determined by the adjustment direction determination part is adjustment of the false rejection rate, and receive, in response thereto, the fourth analysis result from the second signature authentication part, and provide the first analysis result, the fourth analysis result, the first threshold value (ρ) among the first analysis threshold values, and the second analysis threshold values to the final authentication processor.

The first analysis threshold values may include: the first threshold value (ρ) that is a reference value for determining whether authentication succeeds in the first signature authentication algorithm; a second threshold value ($T1_{DL}$) that is set higher than the first threshold value (ρ); and a third threshold value ($T1_S$) that is a reference value for determining whether authentication succeeds in the second signature authentication algorithm, wherein the adjustment direction determination part may be configured to: determine to perform adjustment of the false acceptance rate when the first analysis result is equal to or greater than the first threshold value (ρ) and the second analysis result is equal to or greater than the third threshold value ($T1_S$); determine to perform adjustment of the false acceptance rate when the second analysis result is lower than the third threshold value ($T1_S$), but the first analysis result is equal to or greater than the second threshold value ($T1_{DL}$); or determine to perform adjustment of the false rejection rate when the second analysis result is lower than the third threshold value ($T1_S$) and the first analysis result is equal to or greater than the first threshold value (ρ) or lower than the second threshold value ($T1_{DL}$).

The final authentication processor may be configured to: determine that authentication fails when the first analysis result is lower than the first threshold value (ρ); determine that authentication fails when adjustment of the false acceptance rate is determined as the adjustment direction of the adjustment part and the first analysis result is equal to or greater than the first threshold value (ρ) and is lower than a fourth threshold value ($T2_{DL}$) and the third analysis result is lower than a fifth threshold value ($T2_S$); or determine that authentication succeeds when the first analysis result is equal to or greater than the fourth threshold value ($T2_{DL}$) or the third analysis result is equal to or greater than the fifth threshold value ($T2_S$).

The final authentication processor may be configured to: determine that authentication fails when the first analysis result is lower than the first threshold value (ρ); or determine that the authentication succeeds when adjustment of the false rejection rate is determined as the adjustment direction of the adjustment part and the first analysis result is equal to or greater than the first threshold value (ρ) and is lower than a sixth threshold value ($T3_{DL}$) and the fourth analysis result is equal to or greater than a seventh threshold value ($T3_S$).

The controller may further include: a registration module configured to, before the handwritten signature to be authenticated is input, collect training handwritten signature data, extract signature behavioral characteristic information, perform a primary training by applying all pieces of the signature behavioral characteristic information of the training handwritten signature data and a known authentication result of the training handwritten signature data to each of the first and second signature authentication algorithms, analyze a result of the primary training, and set the first threshold value (ρ), a second threshold value ($T1_{DL}$), and a third threshold value ($T1_S$).

The controller may further include: a registration module configured to, before the handwritten signature to be authenticated is input, apply, to the second signature authentication algorithm, signature behavioral characteristic information sensitive to false-acceptance verification among pieces of the signature behavioral characteristic information extracted from training handwritten signature data and a known authentication result, perform a secondary training, and set the fourth threshold value ($T2_{DL}$) and the fifth threshold value ($T2_S$), considering a result of the secondary training.

The controller may further include: a registration module configured to, before the handwritten signature to be authenticated is input, apply, to the second signature authentication algorithm, signature behavioral characteristic information sensitive to false-rejection verification among pieces of the signature behavioral characteristic information extracted from training handwritten signature data and a known authentication result, perform a tertiary training, and set the sixth threshold value ($T3_{DL}$) and the seventh threshold value ($T3_S$), considering a result of the tertiary training.

Advantageous Effects

According to the present disclosure, an input handwritten signature is authenticated simultaneously using first and second signature authentication algorithms using different methods, all pieces of signature behavioral characteristic information extracted from the input handwritten signature are analyzed using each of the first and second signature authentication algorithms, and it is determined whether authentication succeeds by comparing results of analysis, thereby improving the accuracy and reliability of a result of authenticating a handwritten signature.

In particular, according to the present disclosure, by comparing the result of analysis performed by the first and second signature authentication algorithms with respect to all pieces of the signature behavioral characteristic information extracted from the input handwritten signature, an area in which adjustment of a false acceptance rate is required is distinguished from an area in which adjustment of a false rejection rate is required. In the case of the area in which adjustment of the false acceptance rate is required, authentication is performed again on the basis of signature behavioral characteristic information sensitive to false-acceptance verification, so that the false acceptance rate can be reduced. In the case of the area in which adjustment of the false rejection rate is required, authentication is performed again on the basis of signature behavioral characteristic information sensitive to false-rejection verification, so that the false rejection rate can be reduced.

As such, the present disclosure can improve a false acceptance rate as well as a false rejection rate simultaneously, thereby advancing the accuracy of a result of user authentication.

BEST MODE

Figure 1:
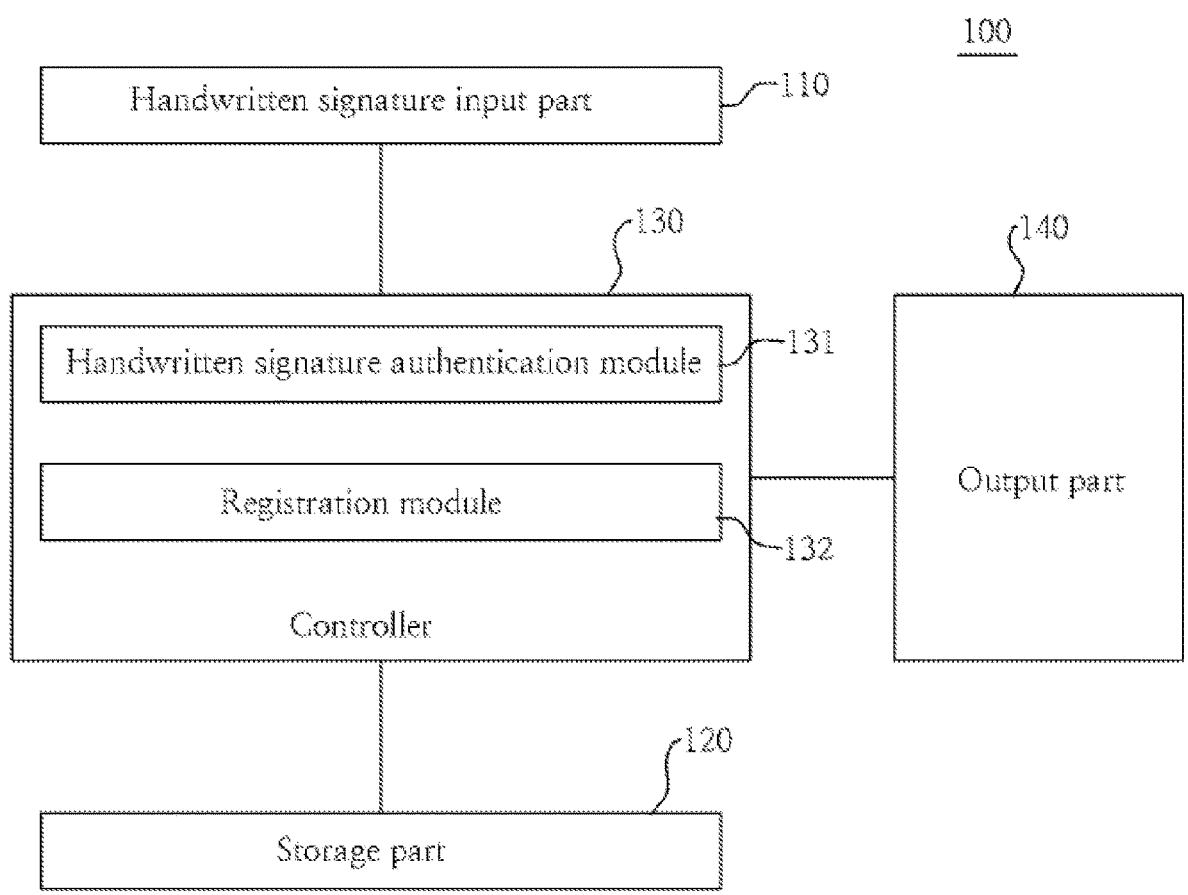
FIG. 1 is a block diagram illustrating a schematic configuration of an apparatus for authenticating a handwritten signature according to the present disclosure.

In a handwritten signature authentication technology according to the present disclosure, user authentication of a handwritten signature may be performed on the basis of characteristic information included in the handwritten signature, specifically, on the basis of image characteristic information of the handwritten signature, or signature behavioral characteristic information occurring in a signatory's signature habits, or both. The signature behavioral characteristic information may include: measurement values such as positions, directions, angles, moving speeds, acceleration, pressure, intersection points, intersection angles, inflection points, and rotation angles at the inflection points of a signature; and distribution characteristics of the positions, directions, angles, moving speeds, acceleration, pressure, intersection points, intersection angles, inflection points, and rotation angles at the inflection points.

In the embodiments described below, a case of using the signature behavioral characteristic information will be described as an example.

In addition, in the handwritten signature authentication technology according to the present disclosure, when performing authentication based on unique characteristic information (for example, signature behavioral characteristic information) extracted from a handwritten signature, a plurality of handwritten signature authentication algorithms using different methods are used. For example, the handwritten signature authentication algorithms used in the present disclosure may include a matching degree analysis algorithm for comparing pieces of signature behavioral characteristic information and scoring the degree of matching for determination, and a deep learning analysis algorithm based on deep learning training.

The former method compares a plurality of pieces of extracted signature behavioral characteristic information with registered signature behavioral characteristic information, scores the degree of matching of each piece, and determines whether authentication succeeds or fails according to the matching degree scores.

The latter method inputs signature behavioral characteristic information of a handwritten signature to be analyzed, to a deep learning algorithm that is trained with training data (a user's handwritten signature and a handwritten signature imitated by forgery/theft/copying) for which a result is known, and determines whether authentication succeeds or fails, on the basis of a value (probability value) indicating the probability of being the user, which is output by the deep learning algorithm.

The present disclosure is not limited thereto, and in addition to the two methods described above, various analysis algorithms currently used or analysis algorithms in currently in development or commercializable may be further used for handwritten signature authentication.

However, the embodiments below are described assuming that the deep learning analysis algorithm and the matching degree analysis algorithm are used. For convenience of description, the former method is called a first signature authentication algorithm, and the latter method is called a second signature authentication algorithm. As described above, the first and second signature authentication algorithms are not limited to the above example, and may be replaced by other known analysis algorithms. In addition, in the embodiment described below, a first signature authentication algorithm may be the matching degree analysis algorithm, and a second signature authentication algorithm may be the deep learning analysis algorithm.

In addition, the handwritten signature authentication technology according to the present disclosure analyzes signature behavioral characteristic information of an input handwritten signature by using the first and second handwritten signature authentication algorithms, wherein a primary analysis is performed on the basis of all pieces of the extracted signature behavioral characteristic information, and an adjustment direction for improving the accuracy of user authentication is determined on the basis of results of the primary analysis performed by the first and second handwritten signature authentication algorithms. Herein, the adjustment direction for the accuracy of user authentication may be a direction of adjusting a false acceptance rate or a false rejection rate or both.

In addition, in the present disclosure, considering the determined adjustment direction, user authentication is performed using the first and second handwritten signature authentication algorithms. For example, user authentication may be performed with the direction of reducing the false acceptance rate or with the direction of reducing the false rejection rate.

That is, according to the present disclosure, by comparing results of analysis performed by the first signature authentication algorithm and the second signature authentication algorithm using different methods, it is determined with which direction the accuracy of user authentication is to be adjusted, and an adjusted user authentication result is derived accordingly, so that a false rejection rate and a false acceptance rate are satisfied together, thus more advancing the accuracy of authentication.

Hereinafter, a configuration and an operation of an apparatus for authenticating a handwritten signature on the basis of the multiple authentication algorithms, which are broadly described above, according to the present disclosure will be described with reference to the drawings, and a method for authenticating a handwritten signature performed by the apparatus will be described in detail with reference to the accompanying drawings.

First, FIG. 1 is a block diagram illustrating a schematic configuration of an apparatus for authenticating a handwritten signature according to the present disclosure. FIG. 1 shows only essential elements for authentication of a handwritten signature. The elements may be configured as an independent apparatus, or may be realized as being attached to a separate system or device or integrated thereinto. For example, the apparatus for authenticating a handwritten signature according to the present disclosure may be realized as being embedded in a mobile device, such as a smartphone or a tablet PC.

Referring to FIG. 1, according to the present disclosure, an apparatus 100 for authenticating a handwritten signature may include a handwritten signature input part 110, a storage part 120, a controller 130, and an output part 140.

The handwritten signature input part 110 is an element for receiving handwritten signature data that is data of a handwritten signature that is written by a user and is to be authenticated. The handwritten signature input part 110 collects image information of a handwritten signature that is written by a user with his or her hand, and/or signature behavioral characteristic information related to the behavior occurring because of the user's unique habits while the user writes the handwritten signature with his or her hand. To this end, the handwritten signature input part 110 may include at least one selected from a group of the following: a scanning device or a camera device for obtaining an image of a handwritten signature; a touch input device enabling a user to write a handwritten signature with his or her hand; and a smart pen equipped with a geomagnetic sensor or an acceleration sensor. When the scanning device is included, image information of a handwritten signature is collected. When the touch input device and the smart pen are included, collected is signature behavioral characteristic information occurring while the user performs signature behavior. The signature behavioral characteristic information may include: measurement values such as positions, directions, angles, moving speeds, acceleration, pressure, intersection points, intersection angles, inflection points, and rotation angles at the inflection points of a signature; and distribution characteristics of the positions, directions, angles, moving speeds, acceleration, pressure, intersection points, intersection angles, inflection point, and rotation angles at the inflection points.

In addition, the handwritten signature input part 110 may collect, in real time, information of a handwritten signature written by a user, or may extract information of a handwritten signature written by a user with his or her hand from a predetermined document or electronic letter.

The handwritten signature input part 110 may be configured at a terminal receiving a handwritten signature, for example, a personal computer, a mobile communication terminal, a POS device, and a payment terminal of a user and an affiliated store, or may be connected thereto via a separate device.

Next, the storage part 120 may include: a program area storing therein a control program for performing handwritten signature authentication based on two or more different authentication algorithms according to the present disclosure; a temporary area temporarily storing therein data occurring during the execution of the control program; and a data area semi-permanently storing therein data occurring during the execution of the control program and data required to execute the control program. That is, the storage part 120 may be an element for storing therein data and/or a program required for handwritten signature authentication according to the present disclosure. Specifically, the control program may include an operating system, and handwritten signature authentication programs including first and second handwritten signature authentication programs realized to perform the first and second handwritten signature authentication algorithms running on the operating system. In the data area of the storage part 120, the following may be stored: information on a handwritten signature of an authenticated user (image information and signature behavioral characteristic information); and first analysis threshold values, which are a first threshold value $\rho$, a second threshold value $T1_{DL}$, a third threshold value $T1_S$, and second analysis threshold values, which are a fourth threshold value $T2_{DL}$, a fifth threshold value $T2_S$, a sixth threshold value $T3_{DL}$, and a seventh threshold value $T3_S$, which are applied in the present disclosure. Hereinafter, the first to third threshold values $\rho$, $T1_{DL}$, and $T1_S$ are collectively referred to as the "first analysis threshold values", and the fourth to seventh threshold values $T2_{DL}$, $T2_S$, $T3_{DL}$, and $T3_S$ are collectively referred to as the "second analysis threshold values".

In addition, when necessary, the storage part 120 may store therein, temporarily or for a predetermined time period, handwritten signature data input through the handwritten signature input part 110. The storage part 120 may be realized as a computer-readable recording medium. Herein, the recording medium may include program instructions, data files, and data structures separately or in combinations. The program instructions recorded on the recording medium may be specially designed and configured for the present disclosure or may be well-known to and usable by those skilled in the art of computer software. For example, examples of the recording medium include: magnetic media such as hard disks, floppy disks, and magnetic tapes; optical media such as compact disk read-only memories (CD-ROMs), and digital video disks (DVDs); magneto-optical media such as floptical disks; and hardware devices, such as ROM, random-access memory (RAM), and flash memory, which are particularly structured to store and execute program instructions. Examples of the program instructions include not only a mechanical language code formatted by a compiler but also a high-level language code that may be implemented by a computer using an interpreter.

Next, the controller 130 is an element controlling and performing the overall operations of the apparatus 100 for authenticating a handwritten signature according to the present disclosure. Specifically, the controller 130 may be realized including at least one processor capable of processing program instructions for performing functions and a process according to a method for authenticating a handwritten signature according to the present disclosure. Herein, examples of the instructions executed by the processor may include interpreted instructions, such as script instructions, i.e., JavaScript or ECMAScript instructions, executable codes, or other instructions stored in a computer-readable medium, and these may be stored in the storage part 120. In one embodiment, the processor may be a single-threaded processor. In another embodiment, the processor may be a multi-threaded processor.

That is, the controller 130 may load and execute a program module stored in the storage part 120, and may control other elements, specifically, the handwritten signature input part 110, the storage part 120, and the output part 140, accordingly, and may perform handwritten signature authentication processing.

The controller 130 may include a handwritten signature authentication module 131 and a registration module 132. The handwritten signature authentication module 131 performs a handwritten signature authentication processing process by using the first and second signature authentication algorithms according to the present disclosure. The registration module 132 is for registering information on a handwritten signature of a normal user, and/or pieces of reference information (for example, first to seventh threshold values) required for the handwritten signature authentication processing process. The handwritten signature authentication module 131 and the registration module 132 may be composed of software and/or hardware combinations. As described above, the handwritten signature authentication module 131 and the registration module 132 may mean program modules executed by the processor, or combinations of the program modules and the processor. A detailed configuration and operation of the handwritten signature authentication module 131 will be described in detail with reference to FIG. 2 below.

Last, the output part 140 is an element for outputting a handwritten signature authentication process or a handwritten signature authentication result. For example, in order to receive a user action required for handwritten signature authentication, the output part 140 may output a report message related thereto. In addition, the output part 140 may output a message indicating an authentication result after handwritten signature authentication is completed.

The above-described elements constituting the apparatus 100 for authenticating a handwritten signature may be provided within one apparatus, or may be separately provided and operated by being connected by wire or wireless. For example, the handwritten signature input part 110 and the output part 140 may be realized as a client device installed at a location close to a user, or a place where a user accesses. The storage part 120 and the controller 130 may be realized as a server device separately that is connected to and cooperates with the client over a wired/wireless network. In this case, the apparatus 100 for authenticating a handwritten signature according to the present disclosure is realized as a server-client system.

That is, the above-described configuration of the apparatus 100 for authenticating a handwritten signature shows only essential elements required for handwritten signature authentication processing, and it is not intended to specify the implementation form by the connection method.

Figure 2:
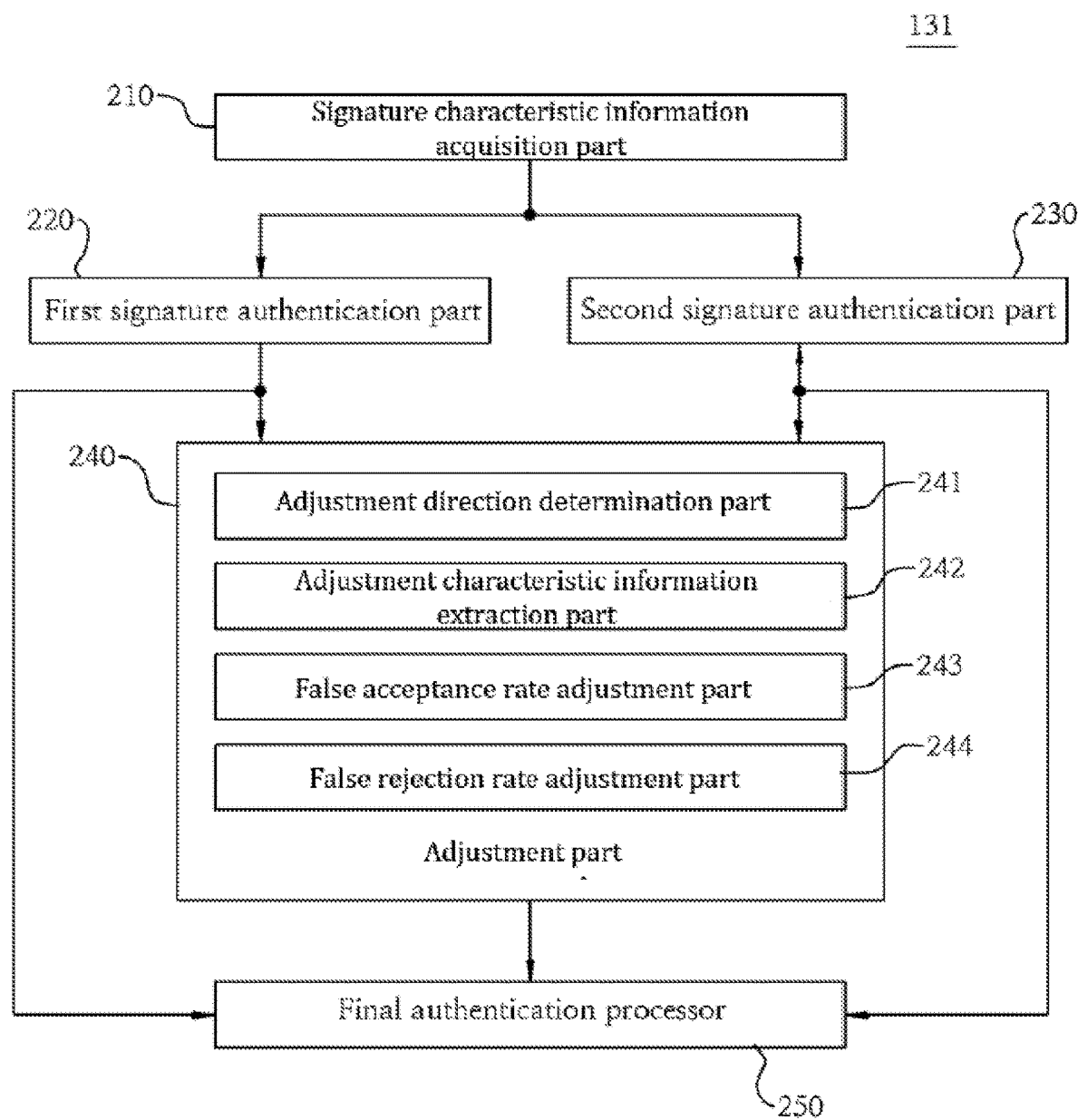
FIG. 2 is a block diagram illustrating a detailed configuration of a handwritten signature authentication module of an apparatus for authenticating a handwritten signature according to an embodiment of the present disclosure.

FIG. 2 is a block diagram illustrating a detailed configuration of a handwritten signature authentication module of an apparatus for authenticating a handwritten signature according to an embodiment of the present disclosure.

Referring to FIG. 2, the handwritten signature authentication module 131 may include a signature characteristic information acquisition part 210, a first signature authentication part 220, a second signature authentication part 230, an adjustment part 240, and a final authentication processor 250.

The signature characteristic information acquisition part 210 may obtain signature behavioral characteristic information through the handwritten signature input part 110 and output the same to the first signature authentication part 220 and the second signature authentication part 230.

The first signature authentication part 220 is an element to which the first signature authentication algorithm is applied. The first signature authentication part 220 applies signature behavioral characteristic information input from the signature characteristic information acquisition part 210 to the first signature authentication algorithm, and outputs a first probability value δ that is a first analysis result to the adjustment part 240 and the final authentication processor 250.

The second signature authentication part 230 is an element to which the second signature authentication algorithm is applied. The second signature authentication part 230 applies signature behavioral characteristic information input from the signature characteristic information acquisition part 210 to the second signature authentication algorithm, and outputs a first score $score_1$ that is a second analysis result to the adjustment part 240 and the final authentication processor 250.

In addition, when adjustment of a false acceptance rate is determined as the adjustment direction by the adjustment part 240, the second signature authentication part 230 receives signature behavioral characteristic information sensitive to false-acceptance verification from the adjustment part 240, applies the input signature behavioral characteristic information sensitive to false-acceptance verification to the second signature authentication algorithm, performs analysis, and outputs a second score $score_2$ that is a third analysis result to the adjustment part 240.

In addition, when adjustment of a false rejection rate is determined as the adjustment direction by the adjustment part 240, the second signature authentication part 230 receives signature behavioral characteristic information sensitive to false-rejection verification from the adjustment part 240, applies the input signature behavioral characteristic information sensitive to false-rejection verification to the second signature authentication algorithm, performs analysis, and outputs a third score $score_3$ that is a fourth analysis result to the adjustment part 240.

The adjustment part 240 includes an adjustment direction determination part 241, an adjustment characteristic information extraction part 242, a false acceptance rate adjustment part 243, and a false rejection rate adjustment part 244. When the first probability value δ is input from the first signature authentication part 220 and the first score $score_1$ is input from the second signature authentication part 230, the adjustment part 240 determines the adjustment direction to determine whether to perform either adjustment of a false acceptance rate or adjustment of a false rejection rate. In order to perform adjusting according to the determined adjustment direction, the adjustment pan 240 obtains the second score score$_2$ and the third score score$_3$ through the second signature authentication part 230 and outputs the same.

Specifically describing, the adjustment direction determination part 241 compares the first probability value δ with the first threshold value ρ, compares the first probability value δ with the second threshold value T1$_{DL}$, compares the first score score$_1$ with the third threshold value T1$_S$ to determine the adjustment direction to determine either adjustment of a false acceptance rate or adjustment of a false rejection rate, and outputs a basic authentication value that is a result of comparing the first probability value δ with the first threshold value ρ to the final authentication processor 250. That is, when the first probability value δ is equal to or greater than the first threshold value ρ, and when the first score score$_1$ is equal to or greater than the third threshold value T1$_S$, or the first score score$_1$ is lower than the third threshold value T1$_S$ and the first probability value δ is equal to or greater than the second threshold value T1$_{DL}$, adjustment of a false acceptance rate is determined. When the first score score$_1$ is lower than the third threshold value T1$_S$ and the first probability value δ is equal to or greater than the first threshold value ρ and is lower than the second threshold value T1$_{DL}$, adjustment of a false rejection rate is determined.

When the adjustment direction determination part 241 determines the adjustment direction, the adjustment characteristic information extraction part 242 extracts sensitive signature behavioral characteristic information according to the adjustment direction among pieces of signature behavioral characteristic information of the entire handwritten signature obtained by the signature characteristic information acquisition part 210.

The sensitive signature behavioral characteristic information according to the adjustment direction may be signature behavioral characteristic information sensitive to false-acceptance verification and signature behavioral characteristic information sensitive to false-rejection verification. The signature behavioral characteristic information sensitive to false-acceptance verification is input to the false acceptance rate adjustment part 243, and the signature behavioral characteristic information sensitive to false-rejection verification is input to the false rejection rate adjustment part 244.

The false acceptance rate adjustment part 243 that has received the signature behavioral characteristic information sensitive to false-acceptance verification provides the second signature authentication part 230 with the signature behavioral characteristic information sensitive to false-acceptance verification so as to obtain a second score score$_2$, and outputs the obtained second score score$_2$ to the final authentication processor 250.

The false rejection rate adjustment part 244 that has received the signature behavioral characteristic information sensitive to false-rejection verification provides the second signature authentication part 230 with the signature behavioral characteristic information sensitive to false-rejection verification so as to obtain a third score score$_3$, and outputs the obtained third score score$_3$ to the final authentication processor 250.

The final authentication processor 250 determines whether handwritten signature authentication succeeds, by using the basic authentication value output from the adjustment direction determination part 241 and results of comparing the first probability value δ input from the first signature authentication part 220, the first score score$_1$ input from the second signature authentication part 230, and the second score score$_2$ and the third score score$_3$ input from the adjustment part 240, with the first to third threshold values ρ, T1$_{DL}$, and T1$_S$, which are the first analysis threshold values, and the fourth to seventh threshold values T2$_{DL}$, T2$_S$, T3$_{DL}$, and T3$_S$, which are the second analysis threshold values.

Figure 3:
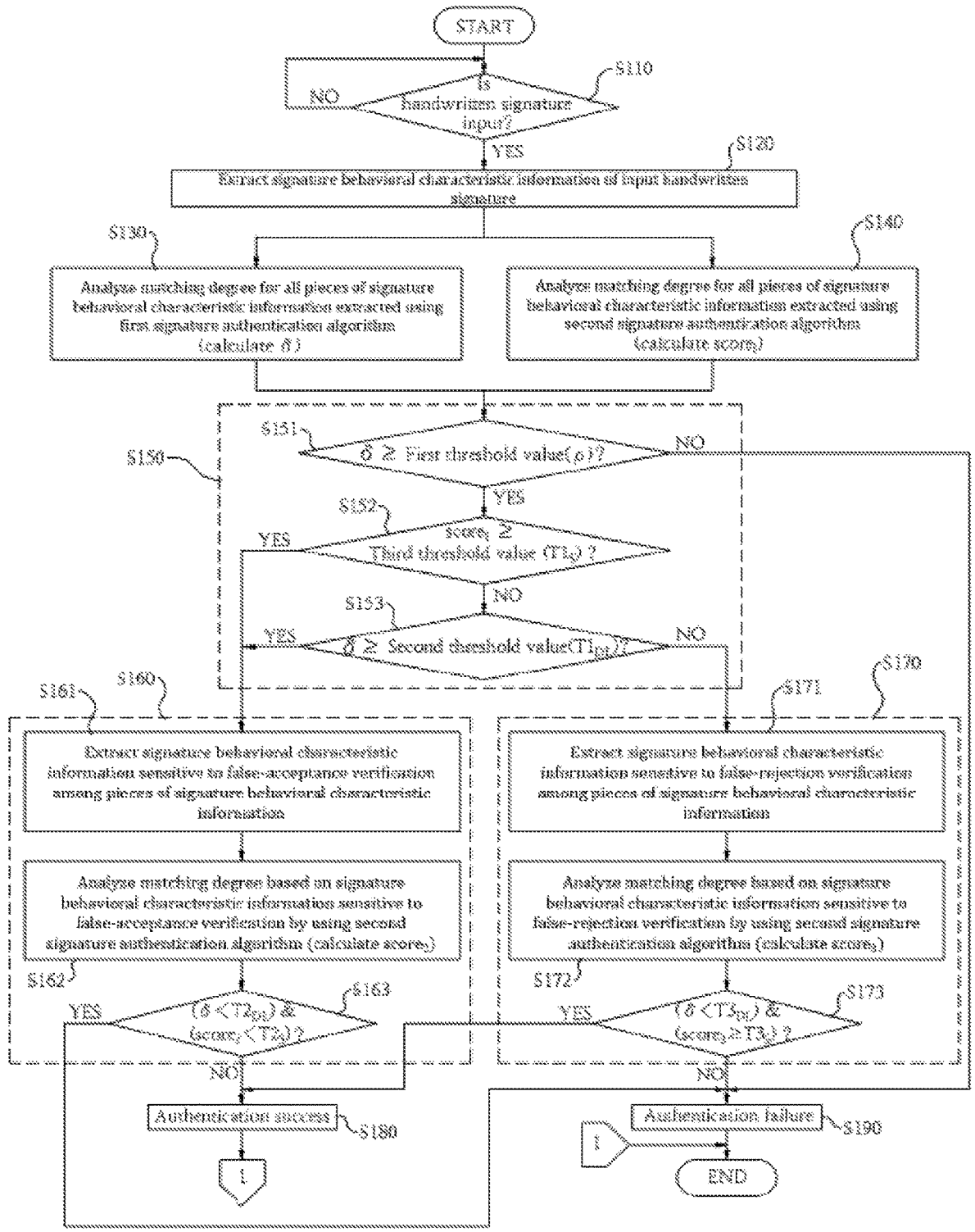
FIG. 3 is a flowchart illustrating a method for authenticating a handwritten signature according to the present disclosure.
Figure 4:
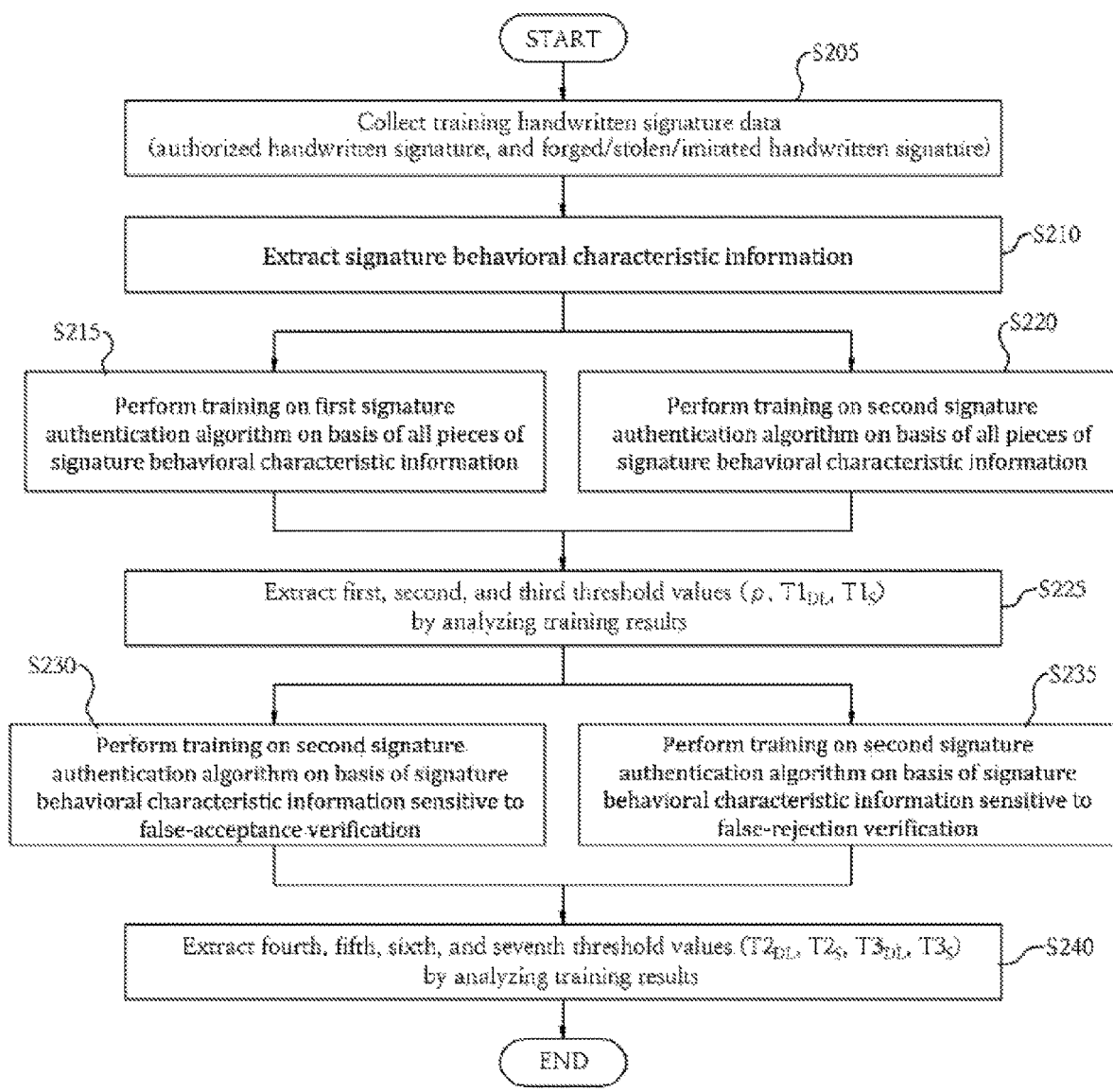
FIG. 4 is a flowchart illustrating a method of setting threshold values, in a method for authenticating a handwritten signature according to the present disclosure.
Figure 5:
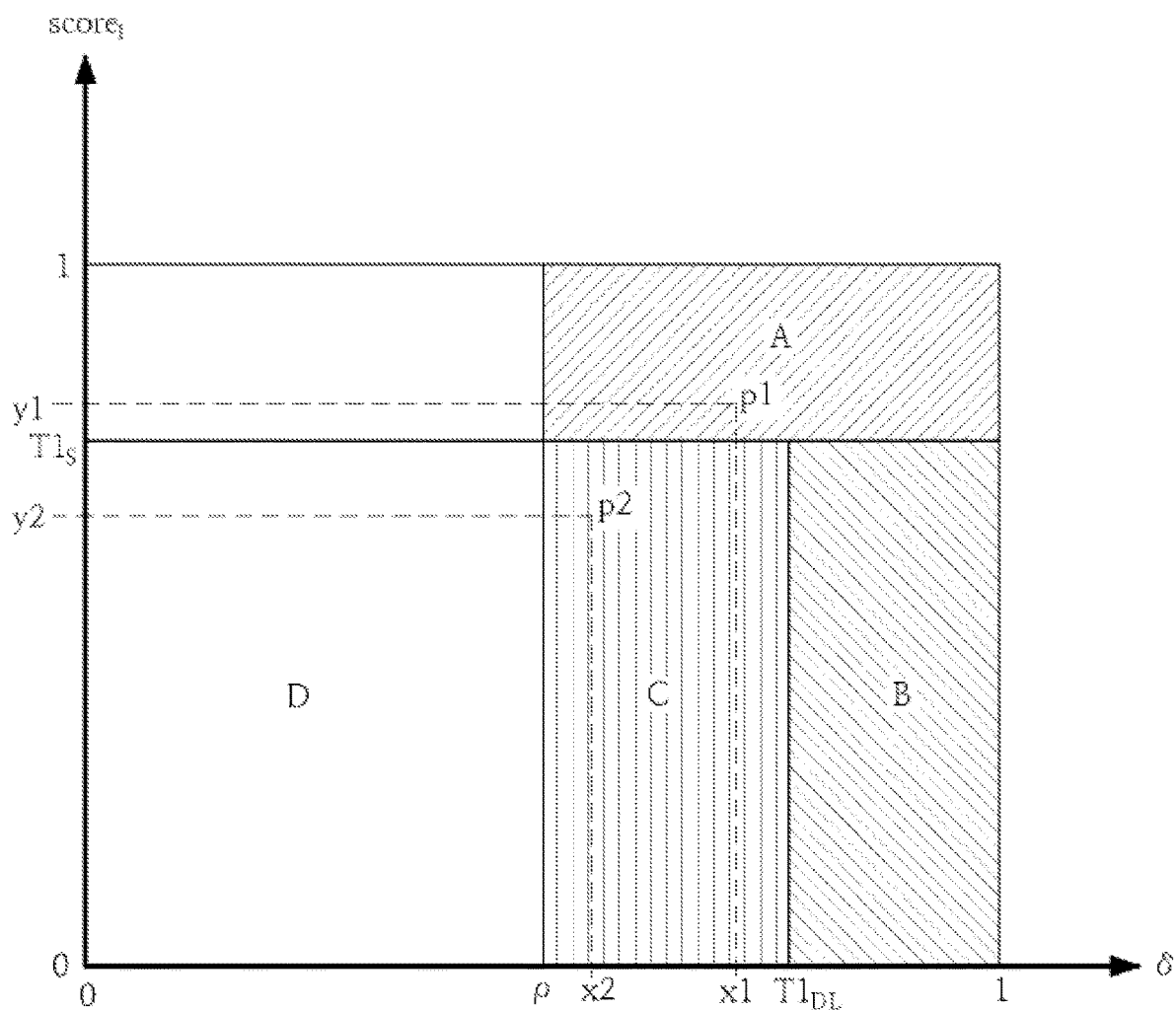
FIG. 5 is a diagram illustrating a method of determining an adjustment direction, in a method for authenticating a handwritten signature according to the present disclosure.
Figure 6:
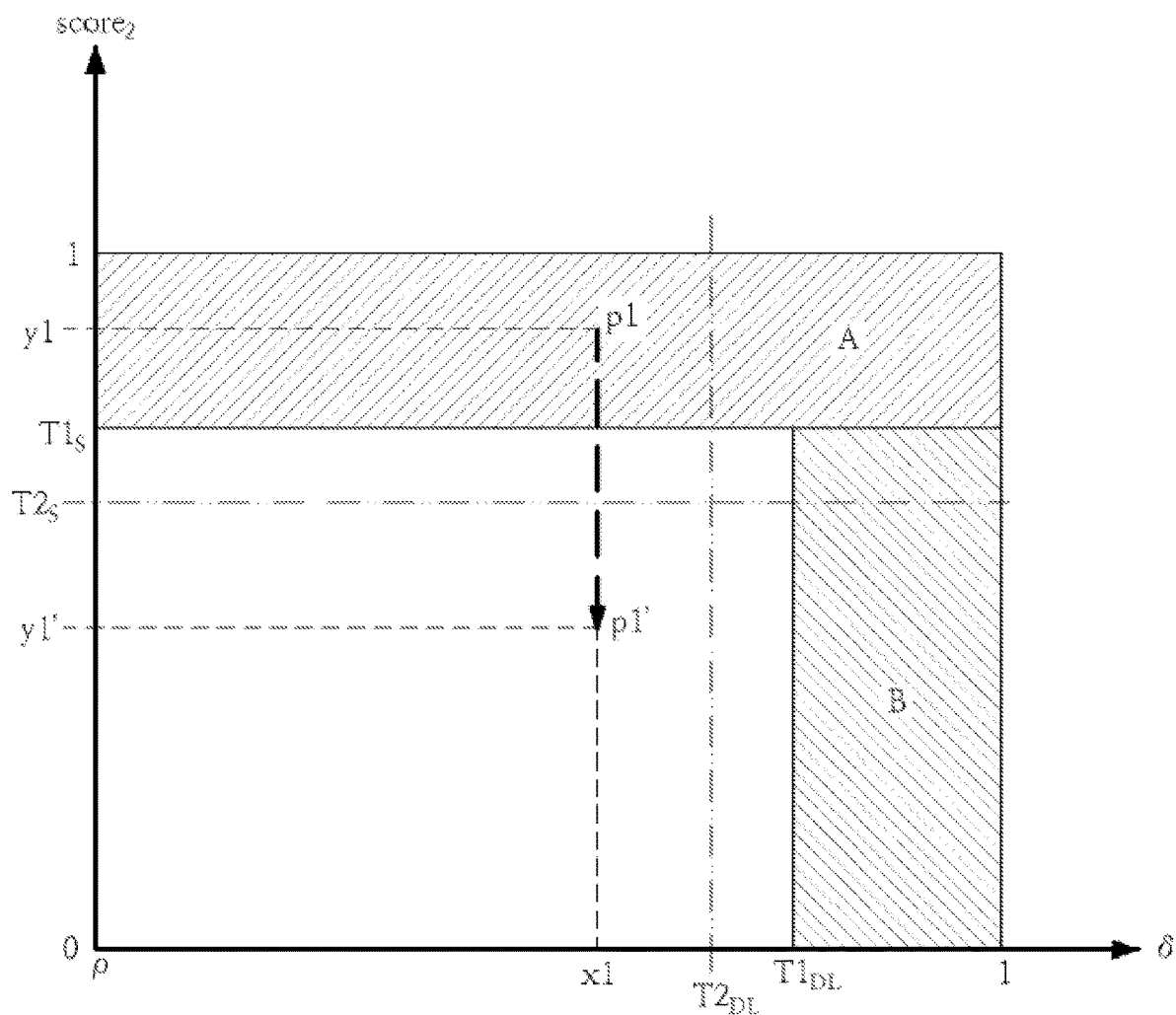
FIG. 6 is a diagram illustrating a method of adjusting a false acceptance rate, in a method for authenticating a handwritten signature according to the present disclosure.
Figure 7:
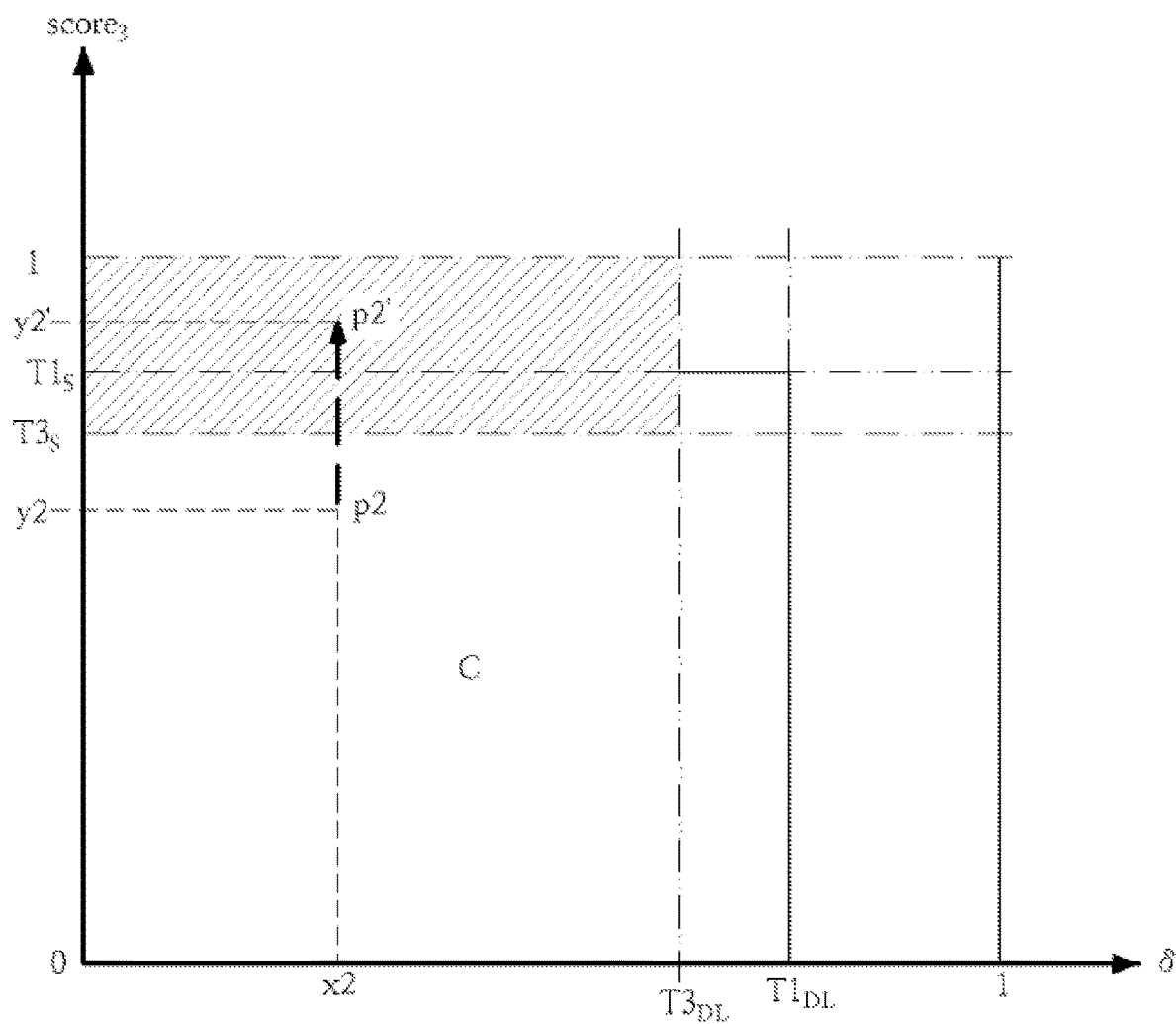
FIG. 7 is a diagram illustrating a method of adjusting a false rejection rate, in a method for authenticating a handwritten signature according to the present disclosure.

FIG. 3 is a flowchart illustrating a method for authenticating a handwritten signature according to the present disclosure. FIG. 4 is a flowchart illustrating a method of setting threshold values, in a method for authenticating a handwritten signature according to the present disclosure. FIG. 5 is a diagram illustrating a method of determining an adjustment direction, in a method for authenticating a handwritten signature according to the present disclosure. FIG. 6 is a diagram illustrating a method of adjusting a false acceptance rate, in a method for authenticating a handwritten signature according to the present disclosure. FIG. 7 is a diagram illustrating a method of adjusting a false rejection rate, in a method for authenticating a handwritten signature according to the present disclosure.

Next, a method for authenticating a handwritten signature performed by the apparatus 100 for authenticating the handwritten signature configured as described above will be described with reference to FIGS. 3 to 7.

In the following description, it is assumed that training of the first and second signature authentication algorithms and setting of the threshold values used for analysis of a handwritten signature and determination have been completed before a handwritten signature request is generated, and have been stored in the storage part 120 of the apparatus 100 for authenticating the handwritten signature. The detailed training and setting process thereof will be separately described later.

Referring to FIG. 3, the apparatus 100 for authenticating a handwritten signature according to the present disclosure receives the handwritten signature to be authenticated, through the handwritten signature input part 110 at step S110, and extracts characteristic information of the input handwritten signature, specifically, signature behavioral characteristic information at step S120. The signature behavioral characteristic information may include: measurement values of positions, directions, angles, moving speeds, acceleration, pressure, intersection points, intersection angles, inflection points, and rotation angles at the inflection points of a signature; and distribution characteristics of the positions, directions, angles, moving speeds, acceleration, pressure, intersection points, intersection angles, inflection points, and rotation angles at the inflection points. In addition, the extracted characteristic information may include image characteristic information in addition to the signature behavioral characteristic information. Herein, the input of a handwritten signature may be performed in a manner that receives the handwritten signature in real time at a signing time point.

As such, when a handwritten signature to be authenticated is input through the handwritten signature input part 110, the controller 130 of the apparatus 100 for authenticating the handwritten signature analyzes signature behavioral characteristic information of the input handwritten signature through the first signature authentication algorithm and the second signature authentication algorithm, and compares the analysis results to determine whether authentication succeeds or fails.

In the present disclosure, specifically describing the process of determining whether authentication succeeds or fails, first, the controller 130 inputs all pieces of the extracted signature behavioral characteristic information to each of the first and second signature authentication algorithms, and performs a primary analysis of the degree of matching with a pre-registered handwritten signature of the user at steps S130 and S140.

That is, all pieces of the extracted signature behavioral characteristic information are applied and the first and second signature authentication algorithms are performed, so that respective analysis results based on all pieces of the signature behavioral characteristic information are extracted by using the two different signature authentication algorithms.

More specifically, an analysis result (hereinafter, referred to as a "first analysis result") of the first signature authentication algorithm realized as a deep learning analysis algorithm is output as a probability value δ of whether the input handwritten signature is the registered handwritten signature of the user. An analysis result (hereinafter, referred to as a "second analysis result") of the second signature authentication algorithm realized as a matching degree analysis algorithm is output as a score indicating the degree of matching. The probability value δ and the score are values indicating the degree of matching between the input handwritten signature and the registered handwritten signature, and may have a predetermined range. For example, each of the probability value δ and the score may have a range of 0 to 1 or a range of 0 to 100. Herein, a value of 1 or 100 indicates the highest degree of matching, and a value of 0 indicates the lowest degree of matching. For reference, for convenience of description, the probability value δ and the score extracted through the primary analysis are referred to as a first probability value δ and a first score $score_1$ respectively.

Herein, since the first and second signature authentication algorithms are based on different analysis techniques, even when the same signature behavioral characteristic information is input, the first and second analysis results of the first and second signature authentication algorithms may be different from each other.

Next, the controller 130 of the apparatus 100 for authenticating the handwritten signature according to the present disclosure determines the adjustment direction for improving the accuracy of user authentication at step S150 by using the first probability value δ and the first score $score_1$ that ae the results of the primary analysis performed by the first and second signature authentication algorithms. The adjustment direction for improving the accuracy of user authentication is set to reduce a false rejection rate or a false acceptance rate that are generally used to determine the accuracy of user authentication. For reference, in the case of a conventional handwritten signature authentication method using a single authentication algorithm, when a false rejection rate is reduced, a false acceptance rate is increased. Conversely, when a false acceptance rate is reduced, a false rejection rate is increased. Therefore, it is difficult to satisfy the false rejection rate and the false acceptance rate simultaneously.

Unlike this, the present disclosure intends to satisfy the false rejection rate and the false acceptance rate simultaneously by determining the adjustment direction of user authentication at step S150 on the basis of the results of the primary analysis performed by the handwritten signature authentication algorithms using two methods, specifically, determining whether to perform adjustment of the false rejection rate with the direction the false rejection rate is adjusted to be reduced, or perform adjustment of the false acceptance rate with the direction the false acceptance rate is adjusted to be reduced. Step S150 will be described with reference to FIG. 5.

At step S150, to determine the adjustment direction, the first probability value δ and the first score $score_1$ are compared with each of the preset threshold values at step S151 to S153. In an embodiment of the present disclosure, the preset threshold values may include one or more of the following values as shown in FIG. 5: the first threshold value ρ that is a reference value for determining whether authentication succeeds in the first signature authentication algorithm; the second threshold value $T1_{DL}$ set higher than the first threshold value ρ; and the third threshold value $T1_S$ that is a reference value for determining whether authentication succeeds in the second signature authentication algorithm. For reference, the first to third threshold values ρ, $T1_{DL}$, and $T1_S$ may be set within the range (0~1) of the first probability value δ and the first score $score_1$ through user selection or analysis of training results.

With respect to the first to third threshold values ρ, $T1_{DL}$, and $T1_S$, namely, the first analysis threshold values, each of the results of analysis performed by the first and second signature authentication algorithms may correspond to any one of Areas A, B, C, and D as shown in FIG. 5.

Area A corresponds to a case in which the first probability value δ of the first signature authentication algorithm is equal to or greater than the first threshold value ρ and the first score $score_1$ of the second signature authentication algorithm is equal to or greater than the third threshold value $T1_S$. Area A is an area having a high probability of being the user.

Area B is an area in which the first score $score_1$ of the second signature authentication algorithm is lower than the third threshold value TIs, but the first probability value δ of the first signature authentication algorithm is equal to or greater than the second threshold value $T1_{DL}$ that is higher than the first threshold value ρ. Area B is an area having a high probability of being the user.

Area C is an area in which the first score $score_1$ of the second signature authentication algorithm is lower than the third threshold value $T1_S$ and the first probability value δ of the first signature authentication algorithm is greater than the first threshold value ρ, but is lower than the second threshold value $T1_{DL}$. Area C has a rather low probability of being the user.

Area D is an area in which the first probability value δ of the first signature authentication algorithm is lower than the first threshold value ρ, which is an area having a high probability of being not the user.

Herein, in the case corresponding to Areas A and B having a high probability of being the user, the controller 130 performs adjustment of the false acceptance rate such that the false acceptance rate is reduced. In the case corresponding to Area C having a rather low probability of being the user, the controller 130 performs adjustment of the false rejection rate such that the false rejection rate is reduced.

By performing adjustment of the false acceptance rate and of the false rejection rate, the apparatus 100 for authenticating the handwritten signature according to the present disclosure can increase the accuracy of a user authentication result.

Accordingly, according to a first embodiment of the present disclosure, the controller 130 compares the first probability value δ extracted by the first signature authentication algorithm with the first threshold value ρ and determines whether the first probability value δ is equal to or greater than the first threshold value pat step S151. This is a process of determining whether the first probability value analyzed in the first signature authentication algorithm satisfies the minimum probability value for authentication success in the first signature authentication algorithm. Herein, when the first probability value δ is lower than the first threshold value ρ (Area D), proceeding to step S190 takes place and authentication failure is determined by the first signature authentication algorithm. Conversely, when the first probability value δ is equal to or greater than the first threshold value ρ, any one of Areas A, B, and C shown in FIG. 5 is involved, so the controller 130 further determines which of Areas A, B, and C is involved.

That is, when the first probability value δ is equal to or greater than the first threshold value ρ, the controller 130 determines whether the first score $score_1$ extracted by the second signature authentication algorithm is equal to or greater than the third threshold value $T1_S$ at step S152. As a result of determination, when the first score $score_1$ is equal to or greater than the third threshold value $T1_S$, Area A of FIG. 5 is involved, so the controller 130 determines adjustment of a false acceptance rate as the adjustment direction so as to reduce the false acceptance rate.

When the first score $score_1$ is lower than the third threshold value $T1_S$, the controller 130 determines whether the first probability value δ extracted by the first signature authentication algorithm is equal to or greater than the second threshold value $T1_{DL}$ at step S153. As a result of determination, when the first probability value δ extracted by the first signature authentication algorithm is equal to or greater than the second threshold value $T1_{DL}$, Area B of FIG. 5 is involved, so the controller 130 determines adjustment of the false acceptance rate as the adjustment direction to reduce the false acceptance rate. Conversely, when the first probability value δ extracted by the first signature authentication algorithm is lower than the second threshold value $T1_{DL}$, Area C of FIG. 5 is involved, so the controller 130 determines adjustment of the false rejection rate as the adjustment direction to reduce the false rejection rate.

When the adjustment direction is determined at step S150, the controller 130 performs user authentication considering the determined adjustment direction at step S160 or S170. That is, when adjustment of the false acceptance rate is determined as the adjustment direction, proceeding to step S160 takes place and the controller 130 performs authentication to which adjustment of the false acceptance rate is applied. When adjustment of the false rejection rate is determined as the adjustment direction, proceeding to step S170 takes place and the controller 130 performs authentication to which adjustment of the false rejection rate is applied. In this embodiment, at steps S160 and S170, adjustment of the false acceptance rate and of the false rejection rate may be performed using the second signature authentication algorithm, but unlike this, may be performed using the first signature authentication algorithm or using the first and second signature authentication algorithms together.

Adjustment of the false acceptance rate at step S160 and adjustment of the false rejection rate at step S170 will be described with reference to FIGS. 6 and 7.

First, adjustment of the false acceptance rate at step S160 will be described. At step S161, the controller 130 extracts signature behavioral characteristic information sensitive to false-acceptance verification among the pieces of signature behavioral characteristic information of the handwritten signature extracted at step S120. At step S162, the controller 130 applies the extracted signature behavioral characteristic information sensitive to false-acceptance verification to the second signature authentication algorithm, and performs a matching degree analysis again. Herein, the calculated analysis result is referred to as a second score $score_2$.

For reference, a handwritten signature imitated by forgery/theft/copying matches with the registered handwritten signature in many pans of a plurality of pieces of signature behavioral characteristic information, so it may be erroneously determined that authentication succeeds. However, among the plurality of pieces of signature behavioral characteristic information, information that cannot be imitated by others exists, and this information may be defined as signature behavioral characteristic information sensitive to false acceptance. Despite matching in most of the pieces of signature behavioral characteristic information among the plurality of pieces of signature behavioral characteristic information, if the signature behavioral characteristic information sensitive to false-acceptance verification shows a large difference, the handwritten signature has a high probability of being a handwritten signature imitated by forgery/theft/copying.

Accordingly, at step S160, authentication is performed based on the signature behavioral characteristic information sensitive to false-acceptance verification, so that an error due to false acceptance is adjusted.

That is, at step S163, the extracted second score $score_2$ and the first probability value δ extracted at step S130 are compared to preset threshold values, and according to a result of comparison, it is determined whether authentication succeeds.

As the threshold values used at step S163, the fourth and fifth threshold values $T2_{DL}$ and $T2_S$ are used for user authentication at step S160. A method of setting the fourth and fifth threshold values will be described with reference to FIG. 4 later.

At step S163, the controller 130 determines whether the first probability value δ is lower than the fourth threshold value $T2_{DL}$, and whether the second score $score_2$ is lower than the fifth threshold value $T2_S$. As a result of determination, when the first probability value δ is lower than the fourth threshold value $T2_{DL}$ and the second score $score_2$ is lower than the fifth threshold value $T2_S$, the controller 130 determines that authentication fails at step S190. When the first probability value δ is equal to or greater than the fourth threshold value $T2_{DL}$ or the second score $score_2$ is equal to or greater than the fifth threshold value $T2_S$, the controller 130 determines that authentication succeeds at step S180.

Referring to FIG. 6, in the embodiment, the fourth threshold value $T2_{DL}$ is a threshold value for the probability value extracted by the first signature authentication algorithm, and is set higher than the first threshold value ρ and lower than the second threshold value $T1_{DL}$. The fifth threshold value $T2_S$ is set lower than the third threshold value $T1_S$. However, in some cases, the fourth and fifth threshold values $T2_{DL}$ and $T2_S$ may be set equal to the second and third threshold values $T1_{DL}$ and $T1_S$, respectively, or greater than the same.

For example, at step S150, when the results of the primary analysis performed by the first and second signature authentication algorithms extracted on the basis of all pieces of signature behavioral characteristic information are p1(x1, y1) shown in FIG. 5, Area A is involved, so it is temporarily determined that authentication succeeds. In this case, as a result of a secondary analysis at step S160, the controller 130 performs authentication after adjusting the false acceptance rate to reduce the false acceptance rate on the basis of the signature behavioral characteristic information sensitive to false-acceptance verification. Therefore, as in p1'(x1, y1') shown in FIG. 6, the second score $score_2$ that is the third analysis result is decreased to y1'. In this case, the first probability value δ is lower than the fourth threshold value $T2_{DL}$ and the second score $score_2$ is y1' lower than the fifth threshold value $T2_S$, so the controller 130 may finally determine that authentication fails.

That is, when Areas A and B of FIG. 5 are involved, the false acceptance rate is further reduced through step S160, so that a handwritten signature imitated by forgery, theft, or copying is filtered out by determining that authentication fails.

Next, adjustment of the false rejection rate at step S170 will be described. At step S171, the controller 130 extracts signature behavioral characteristic information sensitive to false-rejection verification among the pieces of signature behavioral characteristic information of the handwritten signature extracted at step S120. The controller 130 applies the extracted signature behavioral characteristic information sensitive to false-rejection verification to the second signature authentication algorithm, and performs a matching degree analysis again.

Herein, the calculated fourth analysis result is referred to as a third score $score_3$. Describing in detail, depending on an environment or condition at the time of signing, pieces of signature behavioral characteristic information extracted from the same user may have a number of deviations. However, among various pieces of signature behavioral characteristic information, there may be signature behavioral characteristic information that is less affected by the surrounding environment or condition, so this may be defined as signature behavioral characteristic information sensitive to false-rejection verification. There is a high probability of being the user when the degree of matching is high in the analysis based on the signature behavioral characteristic information sensitive to false-rejection verification although the degree of matching is low in the analysis based on all pieces of signature behavioral characteristic information. Accordingly, at step S170, the controller 130 performs authentication based on the signature behavioral characteristic information sensitive to false-rejection verification, so that an error due to false rejection is adjusted.

In addition, at step S173, the controller 130 compares the extracted third score $score_3$ and the first probability value δ extracted at step S130 to preset threshold values, and determines whether authentication succeeds, according to a result of comparison.

At step S173, the sixth and seventh threshold values $T3_{DL}$ and $T3_S$ are used for user authentication. When the first probability value δ is lower than the sixth threshold value $T3_{DL}$ and the third score $score_3$ is equal to or greater than the seventh threshold value $T3_S$, the controller 130 determines that authentication succeeds at step S180. In the opposite case, the controller 130 determines that authentication fails at step S190.

Referring to FIG. 7, in the embodiment, the sixth threshold value $T3_{DL}$ is a threshold value for the probability value extracted by the first signature authentication algorithm, and is set higher than the first threshold value ρ and lower than the second threshold value $T1_{DL}$. The seventh threshold value $T3_S$ is set lower than the third threshold value $T1_S$. However, in some cases, the sixth and seventh threshold values $T3_{DL}$ and $T3_S$ may be set equal to the second and third threshold values $T1_{DL}$ and $T1_S$, respectively, or greater than the same.

Describing with reference to FIGS. 5 and 7 as an example, at step S150, when the results of the primary analysis performed by the first and second signature authentication algorithms extracted on the basis of all pieces of signature behavioral characteristic information are p2(x2, y2) shown in FIG. 5, Area C is involved, so it is temporarily determined that authentication fails. However, as a result of a secondary analysis at step S170, authentication is performed after performing adjustment to reduce the false acceptance rate on the basis of the signature behavioral characteristic information sensitive to false-acceptance verification. Therefore, as in p2'(x2, y2') shown in FIG. 7, the third score $score_3$ is increased to y2'. In this case, the first probability value δ is x2 lower than the sixth threshold value $T3_{DL}$ and the third score $score_3$ is y2' higher than the seventh threshold value $T3_S$, so the controller 130 may finally determine that authentication succeeds.

That is, through step S170, the false rejection rate is further reduced in the case of Area C. Therefore, it may be minimized that the user's handwritten signature is rejected by determining that authentication fails.

Next, with reference to FIG. 4, the process of training the first and second signature authentication algorithms and setting the threshold values used in the above-described handwritten signature authentication process will be described.

It is preferable that the process shown in FIG. 4 is performed before the handwritten signature authentication process shown in FIG. 3.

Referring to FIG. 4, in order to train the first and second signature authentication algorithms and set the threshold values, the registration module 132 of the controller 130 collects training handwritten signature data at step S205. The training handwritten signature data may be input by a manager. Herein, the training handwritten signature data may include: multiple pieces of authorized handwritten signature data of the handwritten signature made by the user in person; and imitated handwritten signature data that is handwritten signature data of a handwritten signature obtained by others by forging, stealing, or imitating the authorized handwritten signature of the user for each piece of the authorized handwritten signature data.

When multiple pieces of the training handwritten signature data are collected, the registration module 132 of the controller 130 extracts, directly or via the handwritten signature authentication module 131, multiple pieces of signature behavioral characteristic information for each of multiple pieces of the authorized handwritten signature data and the imitated handwritten signature data of the collected multiple pieces of the training handwritten signature data at step S210.

When the pieces of the signature behavioral characteristic information are extracted, the registration module 132 of the controller 130 performs a primary training on the first and second signature authentication algorithms by applying the all pieces of the signature behavioral characteristic information extracted from each piece of the training handwritten signature data, at steps S215 and S220. Herein, the training may be performed by applying, to the first and second signature authentication algorithms, the signature behavioral characteristic information extracted for each piece of the training handwritten signature data and information on whether authentication succeeds or fails based on known information. That is, with respect to an authorized handwritten signature, training is performed by applying authentication success as a result value. With respect to an imitated handwritten signature, training is performed by applying authentication failure as a result value. Herein, the primary training is performed using all the collected training handwritten signatures. As the number of pieces of the handwritten signature data used for training increases, the reliability and accuracy of the first and second signature authentication algorithms increase.

In addition, similarly to the primary analysis in the above-described method for authenticating a handwritten signature, all pieces of the signature behavioral characteristic information extracted from each training handwritten signature is used as an input at steps S215 and S220.

The registration module 132 of the controller 130 analyzes the training results at steps S215 and S220 to extract the first threshold value ρ, the second threshold value $T1_{DL}$, and the third threshold value TIs at step S225 that are required to determine the adjustment direction at step S150 of FIG. 3.

Next, the registration module 132 performs a secondary training on the second signature authentication algorithm at step S230 on the basis of signature behavioral characteristic information sensitive to false-acceptance verification among multiple pieces of the signature behavioral characteristic information extracted from the training handwritten signature data. The registration module 132 performs a tertiary training on the second signature authentication algorithm at step S235 on the basis of signature behavioral characteristic information sensitive to false-rejection verification among multiple pieces of the signature behavioral characteristic information extracted from the training handwritten signature data.

Next, the registration module 132 analyzes the results of the secondary and tertiary training, and extracts the fourth and fifth threshold values $T2_{DL}$ and $T2_S$ for adjustment of a false acceptance rate and the sixth and seventh threshold values $T3_{DL}$ and $T3_S$ for adjustment of a false rejection rate, at step S240.

The trained first and second signature authentication algorithms and the extracted first to seventh threshold values ρ, $T1_{DL}$, $T1_S$, $T2_{DL}$, $T2_S$, $T3_{DL}$, and $T3_S$ through the above-described process are stored in the storage part 120 of the apparatus 100 for authenticating the handwritten signature shown in FIG. 1, and are used to authenticate an input handwritten signature.

As described above, although preferred embodiments of the present disclosure are described in the specification and the drawings, it is clear to a person skilled in the art to which the present disclosure pertains that in addition to the embodiments described herein, other modifications based on the technical idea of the present disclosure can be implemented. In addition, although specific terms are used in the specification and the drawings, the terms are used only in a general sense to easily describe the technical details of the present disclosure and help understanding of the present disclosure, and are not intended to limit the scope of the present disclosure.

Although an exemplary apparatus configuration is described in the present specification and the drawings, the subject matters and functional operations described herein may be implemented by any other type of digital electronic circuitry, or implemented in computer software, firmware or hardware including the structure described herein and their structural equivalent, or in any combination thereof. The subject matters described herein may be implemented as one or more computer program products, namely one or more module regarding computer program instructions encoded on a program storage medium so as to control the operation of an apparatus according to the disclosure or allow execution thereby. A computer-readable medium may be a machine-readable storage device, a machine-readable storage substrate, a memory device, a composition of matter effecting a machine-readable propagated signal, or a combination of one or more thereof.

In addition, implementations of the subject matters described in the specification may be implemented in a computing system that includes a back-end component such as a data server, a middleware component such as an application server, a front-end component such as a client computer having a web browser or a graphic user interface through which a user can interact with the implementations of the subject matters described in the specification; or all combinations of one or more of the back-end, middleware, and front-end components. The components of the system may be interconnected by any for or medium of digital data communication, such as a communication network.

Although the specification includes details of multiple specific implementations, the specific implementation details should not be construed as limitations on the scope of any inventions or of what may be claimed, but rather as descriptions of features specific to particular embodiments of particular inventions. Particular features that are described in this specification in the context of separate embodiments can also be implemented in combination in a single embodiment. Conversely, various features that are described in the context of a single embodiment can also be implemented in multiple embodiments separately or in any suitable sub-combination. Further, although features may be described above as acting in particular combinations and even initially claimed as such, in some cases, one or more features from a claimed combination can be excluded from the combination, and the claimed combination may be changed to a sub-combination or variation of a sub-combination.

Similarly, in this specification, the operations are depicted in a particular order in the drawings, but this depiction should not be understood as requiring that the operations be performed in the particular order shown or in a sequential order, or that all illustrated operations be performed, in order to achieve desirable results. In a particular case, multitasking and parallel processing may be advantageous. Further, the separation of various system components in the above-described embodiments should not be understood as requiring such separation in all embodiments, and it should be understood that the described program components and systems can generally be integrated together in a single software product or packaged into multiple software products.

DESCRIPTION OF THE REFERENCE NUMERALS IN THE DRAWINGS

100: Apparatus for authenticating handwritten signature
110: Handwritten signature input part
120: Storage part
130: Controller
131: Handwritten signature authentication module
132: Registration module
140: Output part
210: Signature characteristic information acquisition part
220: First signature authentication part
230: Second signature authentication part
240: Adjustment part
250: Final authentication processor

The invention claimed is:

1. A method for authenticating a handwritten signature, the method comprising:
   receiving, at a characteristic extraction step, the handwritten signature to be authenticated, and extracting a plurality of pieces of signature behavioral characteristic information;

applying, at a first analysis step, all the extracted plurality of the pieces of the signature behavioral characteristic information to each of a first signature authentication algorithm and a second signature authentication algorithm that perform handwritten signature authentication with different techniques, and generating a first analysis result and a second analysis result by analyzing a degree of matching between the received handwritten signature and a registered handwritten signature;

determining, at an adjustment direction determination step, whether to perform either adjustment of a false acceptance rate or adjustment of a false rejection rate, by comparing each of the first analysis result and the second analysis result to each preset first analysis threshold value;

extracting, at a second analysis step, the signature behavioral characteristic information sensitive to false-acceptance verification among the plurality of the pieces of the signature behavioral characteristic information when it is determined to perform adjustment of the false acceptance rate, and generating a third analysis result by analyzing the degree of matching between the received handwritten signature and the registered handwritten signature on the basis of the extracted signature behavioral characteristic information sensitive to false-acceptance verification;

extracting, at a third analysis step, the signature behavioral characteristic information sensitive to false-rejection verification among the plurality of the pieces of the signature behavioral characteristic information when it is determined to perform adjustment of the false rejection rate, and generating a fourth analysis result by analyzing the degree of matching between the received handwritten signature and the registered handwritten signature on the basis of the extracted signature behavioral characteristic information sensitive to false-rejection verification; and determining, at a handwritten signature authentication step, whether authentication of the received handwritten signature succeeds, by comparing one or more of the analysis results of the first to the third analysis step to the first analysis threshold values and preset second analysis threshold values, wherein the first analysis threshold values include: a first threshold value ($\rho$) that is a reference value for determining whether authentication succeeds in the first signature authentication algorithm; a second threshold value ($T1_{DL}$) that is a reference value for the first signature authentication algorithm and is set higher than the first threshold value ($\rho$); and a third threshold value ($T1_S$) that is a reference value for determining whether authentication succeeds in the second signature authentication algorithm, and the adjustment direction determination step comprises:

determining to perform adjustment of the false acceptance rate at a false acceptance rate adjustment determination step when the first analysis result is equal to or greater than the first threshold value ($\rho$), and when the second analysis result is equal to or greater than the third threshold value ($T1_S$), or the second analysis result is lower than the third threshold value ($T1_S$) and the first analysis result is equal to or greater than the second threshold value ($T1_{DL}$); and determining to perform adjustment of the false rejection rate at a false rejection rate adjustment determination step when the second analysis result is lower than the third threshold value ($T1_S$) and the first analysis result is equal to or greater than the first threshold value ($\rho$) or lower than the second threshold value ($T1_{DL}$).

2. The method of claim 1, further comprising:

collecting training handwritten signature data and setting the first threshold value ($\rho$), the second threshold value ($T1_{DL}$), and the third threshold value ($T1_S$) that are the first analysis threshold values resulting from training before the handwritten signature to be authenticated is received, at a first analysis threshold value setting step, wherein the first analysis threshold value setting step further comprises:

collecting the training handwritten signature data and extracting signature behavioral characteristic information before the handwritten signature to be authenticated is received;

performing a primary training by applying all pieces of the signature behavioral characteristic information of the training handwritten signature data and a known authentication result of the training handwritten signature data to each of the first and second signature authentication algorithms; and extracting and setting the first threshold value ($\rho$), the second threshold value ($T1_{DL}$), and the third threshold value ($T1_S$) by analyzing a result of the primary training.

3. A method for authenticating a handwritten signature, the method comprising:

receiving, at a characteristic extraction step, the handwritten signature to be authenticated, and extracting a plurality of pieces of signature behavioral characteristic information;

applying, at a first analysis step, all the extracted plurality of the pieces of the signature behavioral characteristic information to each of a first signature authentication algorithm and a second signature authentication algorithm that perform handwritten signature authentication with different techniques, and generating a first analysis result and a second analysis result by analyzing a degree of matching between the received handwritten signature and a registered handwritten signature;

determining, at an adjustment direction determination step, whether to perform either adjustment of a false acceptance rate or adjustment of a false rejection rate, by comparing each of the first analysis result and the second analysis result to each preset first analysis threshold value;

extracting, at a second analysis step, the signature behavioral characteristic information sensitive to false-acceptance verification among the plurality of the pieces of the signature behavioral characteristic information when it is determined to perform adjustment of the false acceptance rate, and generating a third analysis result by analyzing the degree of matching between the received handwritten signature and the registered handwritten signature on the basis of the extracted signature behavioral characteristic information sensitive to false-acceptance verification;

extracting, at a third analysis step, the signature behavioral characteristic information sensitive to false-rejection verification among the plurality of the pieces of the signature behavioral characteristic information when it is determined to perform adjustment of the false rejection rate, and generating a fourth analysis result by analyzing the degree of matching between the received handwritten signature and the registered handwritten signature on the basis of the extracted signature behavioral characteristic information sensitive to false-rejection verification; and determining, at a handwritten signature authentication step, whether authentication of the received handwritten signature succeeds, by comparing one or more of the analysis results of the first to the third analysis step to the first analysis threshold values and preset second analysis threshold values, wherein the third analysis result and the fourth analysis result are obtained by an analysis based on the second signature authentication algorithm, and at the determining of whether authentication succeeds, whether authentication succeeds is determined by comparing the first analysis result and the second analysis result of the first analysis step to the first analysis threshold values, and by comparing the first analysis result, the third analysis result, and the fourth analysis result to a first threshold value ($\rho$) among the first analysis threshold values and the second analysis threshold values.

4. The method of claim 3, wherein at the determining of whether authentication succeeds, it is determined that authentication fails when the first analysis result analyzed at the first analysis step is lower than a fourth threshold value ($T2_{DL}$) that is one of the second analysis threshold values and the third analysis result analyzed at the second analysis step is lower than a fifth threshold value ($T2_S$) that is one of the second analysis threshold values, or it is determined that authentication succeeds when the first analysis result is equal to or greater than the fourth threshold value ($T2_{DL}$) or the third analysis result is equal to or greater than the fifth threshold value ($T2_S$).

5. The method of claim 3, wherein at the determining of whether authentication succeeds, it is determined that authentication succeeds when the first analysis result analyzed at the first analysis step is lower than a sixth threshold value ($T3_{DL}$) that is one of the second analysis threshold values and the fourth analysis result analyzed at the third analysis step is equal to or greater than a seventh threshold value ($T3_S$) that is one of the second analysis threshold values.

6. The method of claim 4, further comprising:

collecting training handwritten signature data and setting the second analysis threshold values that are analyzed through training by applying, to the second signature authentication algorithm, signature behavioral characteristic information sensitive according to a determined adjustment direction among pieces of the signature behavioral characteristic information extracted from the collected training handwritten signature data, before the handwritten signature to be authenticated is received, at a second analysis threshold value setting step, wherein the second analysis threshold value setting step comprises:

selecting the signature behavioral characteristic information sensitive to false-acceptance verification among the pieces of the signature behavioral characteristic information when the determined adjustment direction is adjustment of the false acceptance rate, at a selection step of signature behavioral characteristic information sensitive-to false-acceptance verification;

performing a secondary training by applying, to the second signature authentication algorithm, the selected signature behavioral characteristic information sensitive to false-acceptance verification and a known authentication result of the signature behavioral characteristic information sensitive to false-acceptance verification, at a secondary training step; and extracting and setting the fourth threshold value ($T2_{DL}$) and the fifth threshold value ($T2_S$) that are the second analysis threshold values, considering a result of the secondary training, at a threshold value setting step.

7. The method of claim 5, further comprising:

collecting training handwritten signature data and setting the second analysis threshold values that are analyzed through training by applying, to the second signature authentication algorithm, signature behavioral characteristic information sensitive according to a determined adjustment direction among pieces of the signature behavioral characteristic information extracted from the collected training handwritten signature data, before the handwritten signature to be authenticated is received, at a second analysis threshold value setting step, wherein the second analysis threshold value setting step comprises:

selecting the signature behavioral characteristic information sensitive to false-rejection verification among the pieces of the signature behavioral characteristic information when the determined adjustment direction is adjustment of the false rejection rate, at a selection step of signature behavioral characteristic information sensitive-to false-rejection verification;

performing a tertiary training by applying, to the second signature authentication algorithm, the selected signature behavioral characteristic information sensitive to false-rejection verification and a known authentication result of the signature behavioral characteristic information sensitive to false-rejection verification, at a tertiary training step; and extracting and setting the sixth threshold value ($T3_{DL}$) and the seventh threshold value ($T3_S$) that are the second analysis threshold values, considering a result of the tertiary training, at a threshold value setting step.

8. An apparatus for authenticating a handwritten signature, the apparatus comprising:

a handwritten signature input part configured to extract signature behavioral characteristic information from handwritten signature data of the handwritten signature that a user is writing by hand, and output the signature behavioral characteristic information;

a storage part configured to store therein a first signature authentication algorithm and a second signature authentication algorithm using different handwritten signature authentication techniques, and store therein first analysis threshold values and second analysis threshold values for determining authentication for the first signature authentication algorithm and determining authentication for the second signature authentication algorithm; and a controller configured to: apply the signature behavioral characteristic information for analysis to each of the first signature authentication algorithm and the second signature authentication algorithm when the signature behavioral characteristic information is obtained; obtain a first analysis result analyzed by the first signature authentication algorithm and a second analysis result analyzed by the second signature authentication algorithm; determine an adjustment direction to determine whether to perform either adjustment of a false acceptance rate or adjustment of a false rejection rate, by comparing the obtained first analysis result and the obtained second analysis result to the first analysis threshold values; obtain a third analysis result and a fourth analysis result by extracting only the signature behavioral characteristic information sensitive according to the determined adjustment direction among all pieces of the signature behavioral characteristic information, and by applying the extracted signature behavioral characteristic information sensitive according to the determined adjustment direction to the second signature authentication algorithm; and determine whether authentication of the handwritten signature succeeds, by comparing the first analysis result, the third analysis result, and the fourth analysis result to a first threshold value ($\rho$) among the first analysis threshold values and the second analysis threshold values preset, wherein the controller comprises a handwritten signature authentication module, wherein the handwritten signature authentication module comprises:

a signature characteristic information acquisition part configured to obtain the signature behavioral characteristic information of the entire handwritten signature to be authenticated, through the handwritten signature input part, and output the signature behavioral characteristic information;

a first signature authentication part to which the first signature authentication algorithm is applied, and configured to output the first analysis result by applying the all pieces of the signature behavioral characteristic information input from the signature characteristic information acquisition part to the first signature authentication algorithm and by performing analysis;

a second signature authentication part to which the second signature authentication algorithm is applied, and configured to output the second analysis result by applying the all pieces of the signature behavioral characteristic information input from the signature characteristic information acquisition part to the second signature authentication algorithm and by performing analysis, and output the third analysis result and the fourth analysis result by receiving the signature behavioral characteristic information sensitive according to the adjustment direction, by applying the received signature behavioral characteristic information sensitive according to the adjustment direction to the second signature authentication algorithm, and by performing analysis;

an adjustment part configured to: obtain the first analysis result from the first signature authentication part; obtain the second analysis result from the second signature authentication part; compare the obtained first analysis result and the obtained second analysis result to the first analysis threshold values to determine the adjustment direction to determine whether to perform either adjustment of the false acceptance rate or adjustment of the false rejection rate; and obtain and output the third analysis result and the fourth analysis result by extracting only the signature behavioral characteristic information sensitive according to the determined adjustment direction among the all pieces of the signature behavioral characteristic information, and by applying the extracted signature behavioral characteristic information sensitive according to the determined adjustment direction to the second signature authentication algorithm; and a final authentication processor configured to determine whether authentication of the handwritten signature succeeds, by comparing the first analysis result, the third analysis result, and the fourth analysis result to the first threshold value ($\rho$) among the first analysis threshold values and the second analysis threshold values preset.

9. The apparatus of claim 8, wherein the adjustment part comprises:

an adjustment direction determination part configured to obtain the first analysis result from the first signature authentication part, obtain the second analysis result from the second signature authentication part, and compare the obtained first analysis result and the obtained second analysis result to the first analysis threshold values to determine the adjustment direction to determine whether to perform either adjustment of the false acceptance rate or adjustment of the false rejection rate;

an adjustment characteristic information extraction part configured to extract and output the signature behavioral characteristic information sensitive to false-acceptance verification among the all pieces of the signature behavioral characteristic information when the adjustment direction determined by the adjustment direction determination part is adjustment of the false acceptance rate, or configured to extract and output the signature behavioral characteristic information sensitive to false-rejection verification among the all pieces of the signature behavioral characteristic information when the adjustment direction is adjustment of the false rejection rate;

a false acceptance rate adjustment part configured to provide the second signature authentication part with the signature behavioral characteristic information sensitive to false-acceptance verification output from the adjustment characteristic information extraction part when the adjustment direction determined by the adjustment direction determination part is adjustment of the false acceptance rate, and receive, in response thereto, the third analysis result from the second signature authentication part, and provide the first analysis result, the third analysis result, the first threshold value ($\rho$) among the first analysis threshold values, and the second analysis threshold values to the final authentication processor; and a false rejection rate adjustment part configured to provide the second signature authentication part with the signature behavioral characteristic information sensitive to false-rejection verification output from the adjustment characteristic information extraction part when the adjustment direction determined by the adjustment direction determination part is adjustment of the false rejection rate, and receive, in response thereto, the fourth analysis result from the second signature authentication part, and provide the first analysis result, the fourth analysis result, the first threshold value ($\rho$) among the first analysis threshold values, and the second analysis threshold values to the final authentication processor.

10. The apparatus of claim 9, wherein the first analysis threshold values include: the first threshold value ($\rho$) that is a reference value for determining whether authentication succeeds in the first signature authentication algorithm; a second threshold value ($T1_{DL}$) that is set higher than the first threshold value ($\rho$); and a third threshold value ($T1_S$) that is a reference value for determining whether authentication succeeds in the second signature authentication algorithm,
wherein the adjustment direction determination part is configured to
determine to perform adjustment of the false acceptance rate when the first analysis result is equal to or greater than the first threshold value ($\rho$) and the second analysis result is equal to or greater than the third threshold value ($T1_S$),
determine to perform adjustment of the false acceptance rate when the second analysis result is lower than the third threshold value ($T1_S$), but the first analysis result is equal to or greater than the second threshold value ($T1_{DL}$), or
determine to perform adjustment of the false rejection rate when the second analysis result is lower than the third threshold value ($T1_S$) and the first analysis result is equal to or greater than the first threshold value ($\rho$) or lower than the second threshold value ($T1_{DL}$).

11. The apparatus of claim 8, wherein the final authentication processor is configured to
determine that authentication fails when the first analysis result is lower than the first threshold value ($\rho$),
determine that authentication fails when adjustment of the false acceptance rate is determined as the adjustment direction of the adjustment part and the first analysis result is equal to or greater than the first threshold value ($\rho$) and is lower than a fourth threshold value ($T2_{DL}$) and the third analysis result is lower than a fifth threshold value ($T2_S$), or
determine that authentication succeeds when the first analysis result is equal to or greater than the fourth threshold value ($T2_{DL}$) or the third analysis result is equal to or greater than the fifth threshold value ($T2_S$).

12. The apparatus of claim 8, wherein the final authentication processor is configured to
determine that authentication fails when the first analysis result is lower than the first threshold value ($\rho$), or
determine that the authentication succeeds when adjustment of the false rejection rate is determined as the adjustment direction of the adjustment part and the first analysis result is equal to or greater than the first threshold value ($\rho$) and is lower than a sixth threshold value ($T3_{DL}$) and the fourth analysis result is equal to or greater than a seventh threshold value ($T3_S$).

13. The apparatus of claim 8, wherein the controller is further configured to, before the handwritten signature to be authenticated is input, collect training handwritten signature data, extract signature behavioral characteristic information, perform a primary training by applying all pieces of the signature behavioral characteristic information of the training handwritten signature data and a known authentication result of the training handwritten signature data to each of the first and second signature authentication algorithms, analyze a result of the primary training, and set the first threshold value ($\rho$), a second threshold value ($T1_{DL}$), and a third threshold value ($T1_S$).

14. The apparatus of claim 11, wherein the controller is further configured to, before the handwritten signature to be authenticated is input, apply, to the second signature authentication algorithm, signature behavioral characteristic information sensitive to false-acceptance verification among pieces of the signature behavioral characteristic information extracted from training handwritten signature data and a known authentication result, perform a secondary training, and set the fourth threshold value ($T2_{DL}$) and the fifth threshold value ($T2_S$), considering a result of the secondary training.

15. The apparatus of claim 12, wherein the controller is further configured to, before the handwritten signature to be authenticated is input, apply, to the second signature authentication algorithm, signature behavioral characteristic information sensitive to false-rejection verification among pieces of the signature behavioral characteristic information extracted from training handwritten signature data and a known authentication result, perform a tertiary training, and set the sixth threshold value ($T3_{DL}$) and the seventh threshold value ($T3_S$), considering a result of the tertiary training.

* * * * *